(12) United States Patent
Potter et al.

(10) Patent No.: US 11,727,026 B2
(45) Date of Patent: *Aug. 15, 2023

(54) DISPLAY TOOL

(71) Applicant: The Prudential Insurance Company of America, Newark, NJ (US)

(72) Inventors: Christopher Brian Potter, Mooresville, NC (US); Brian James Perra, Andover, MN (US); Caroline Frances Stephani, Maple Grove, MN (US); Lisa Marie Wark, Zimmerman, MN (US); Jeff Lee Dennie, Champlin, MN (US); Michelle Nicole Samuel, West Lafayette, IN (US)

(73) Assignee: THE PRUDENTIAL INSURANCE COMPANY OF AMERICA, Newark, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/552,644

(22) Filed: Dec. 16, 2021

(65) Prior Publication Data
US 2022/0107943 A1    Apr. 7, 2022

Related U.S. Application Data

(63) Continuation of application No. 17/120,734, filed on Dec. 14, 2020, now Pat. No. 11,210,311, which is a
(Continued)

(51) Int. Cl.
*G06F 16/24* (2019.01)
*G06F 16/248* (2019.01)
(Continued)

(52) U.S. Cl.
CPC .......... *G06F 16/248* (2019.01); *G06F 16/252* (2019.01); *G06Q 40/08* (2013.01)

(58) Field of Classification Search
CPC ...... G06F 16/248; G06F 16/252; G06Q 40/08
See application file for complete search history.

(56) References Cited

U.S. PATENT DOCUMENTS 5,752,236 A * 5/1998 Sexton ................... G06Q 40/10
708/163
9,892,461 B2 * 2/2018 Keyes ..................... G06Q 40/08
(Continued)

*Primary Examiner* — David E Choi
(74) *Attorney, Agent, or Firm* — Baker Botts L.L.P.

(57) ABSTRACT

An apparatus includes a display, a memory, and a hardware processor. The processor accesses a database that includes initial assumptions, current assumptions, values of a life insurance policy over time, transactions, and payments. The processor displays on a first region of the display a baseline curve, a historical performance curve, and an in-force curve. The processor further displays on various other regions of the display a series of points representing the transactions, a current policy value, a first link to download a first file, a second link to display the current assumptions, a third link to download a second file, a fourth link to display the initial assumptions, a fifth link to open an in-force illustrator used to generate an illustration, a sixth link to create or update a new baseline, a seventh link to display the payments, and an eighth link to display the transactions.

20 Claims, 16 Drawing Sheets

Related U.S. Application Data continuation of application No. 16/507,993, filed on Jul. 10, 2019, now Pat. No. 10,896,190.

(51) Int. Cl.
   *G06F 16/25* (2019.01)
   *G06Q 40/08* (2012.01)

(56) References Cited

U.S. PATENT DOCUMENTS

| | | | |
|---|---|---|---|
| 10,565,599 B2* | 2/2020 | Rodkey | G06Q 40/02 |
| 2003/0061196 A1* | 3/2003 | Hirasawa | G06F 16/957 |
| 2004/0236612 A1* | 11/2004 | Heusinkveld | G06Q 40/08 |
| | | | 705/4 |
| 2005/0197964 A1* | 9/2005 | Duggan | G06Q 30/06 |
| | | | 705/57 |
| 2008/0115057 A1* | 5/2008 | Grandhi | G06F 40/103 |
| | | | 715/272 |
| 2012/0047498 A1* | 2/2012 | Motta | G06F 8/65 |
| | | | 717/171 |
| 2013/0085854 A1* | 4/2013 | Masuko | G06Q 30/0601 |
| | | | 705/14.53 |
| 2013/0173312 A1* | 7/2013 | Wetmore | G06Q 40/08 |
| | | | 705/4 |
| 2015/0081345 A1* | 3/2015 | Wallach | G06Q 40/08 |
| | | | 705/4 |
| 2015/0106947 A1* | 4/2015 | Holman | G06F 21/6245 |
| | | | 726/26 |
| 2015/0187150 A1* | 7/2015 | Favier | E05B 73/0017 |
| | | | 340/5.6 |
| 2016/0284029 A1* | 9/2016 | Rhodes | G06Q 40/08 |
| 2018/0181974 A1* | 6/2018 | Lynch | G06Q 30/0206 |
| 2019/0244451 A1* | 8/2019 | Favier | E05B 73/0052 |
| 2020/0252423 A1* | 8/2020 | Hogg | H04L 63/1433 |
| 2020/0272622 A1* | 8/2020 | Amel | G06Q 10/06 |
| 2021/0011907 A1* | 1/2021 | Potter | G06F 16/25 |
| 2021/0097066 A1 | 4/2021 | Potter | |

* cited by examiner

FIG. 2A

Inforce Illustration Assumptions

Illustration Date: 4/21/2018

Death Benefit

Basic Insurance Amount $250,000.00
Death Benefit Type Variable

Rate of Return

Annual Rate of Return 7.06% Net

Premium

Premiums 6/17/2018 – 1/17/2039 $146.61/Monthly

Distributions

Fund Withdrawals None
Loans None

Riders

Fund Withdrawals

* See illustration for details

Close

FIG. 5

| | YOUR INSURANCE PROTECTION | | YOUR CASH VALUE ACCUMULATION | |
|---|---|---|---|---|
| | Net Death Benefit | Illustrated Lapse Date | Net Cash Value | Rate of Return (Net) |
| Current Policy Information As of 1/19/2019 | △$274,609.14▽ | △Not Illustrated to Lapse▽ | △$24,609.14▽ | 8.70%▽ |
| Baseline Illustration Information As of 1/16/2019 | $274,249.00 | Not Illustrated to Lapse | $24,249.00 | 7.06% |

▷Full Policy Details

Billed Premium
$146.61/Monthly-EFT
Baseline Illustration Premium Schedule

| Date ▲ | Amount/Frequency |
|---|---|
| 02/17/2079 – and thereafter | No Billing |
| 02/17/2039 – 01/17/2079 | $136.33/Monthly-EFT |
| 02/17/2004 – 01/17/2039 | $146.61/Monthly-EFT |

[Back to Dashboard] — 620

615

Payments — 605
Payment History

| Date ▲ | Type ▼ | Amount |
|---|---|---|
| 06/12/2018 | Premium | $10,000.00 |
| 04/22/2018 | Loan Repayment | $16,624.10 |
| 04/22/2018 | Premium | $6,000.00 |

610A  610B  610C  610

Hello, ___
Notifications

Beneficiaries

RESOURCES
• Welcome to LifeInsight
• Training Module
• Glossary of Terms
• How to Set a Baseline
• FAQ
• Prospectus and Monthly Performance Review

[−] Feedback

| | YOUR INSURANCE PROTECTION | | YOUR CASH VALUE ACCUMULATION | |
|---|---|---|---|---|
| | Net Death Benefit | Illustrated Lapse Date | Net Cash Value | Rate of Return (Net) |
| Current Policy Information As of 1/19/2019 | ▲$274,609.14▽ | ▲Not Illustrated to Lapse▽ | ▲$24,609.14▽ | 8.70% |
| Baseline Illustration Information As of 1/16/2019 | $274,249.00 | Not Illustrated to Lapse | $24,249.00 | 7.06% |

▸Full Policy Details     Back to Dashboard — 1220

Notifications

All messages ⇕   Newest ⇕

| Fund Withdrawal Assumed on November 13, 2019 | 10/13/2019 > | — 1215a |
| Multiple Assumed Actions Assumed on June 13, 2019 | 5/13/2019 > | — 1215b |
| Policy Status Change to Lapse Pending | 2/13/2019 > | — 1215c |
| Multiple Assumed Actions Assumed on November 13, 2018 | 10/13/2018 > | — 1215d |

— 1210

1205 —

🔔 Notifications
Hello, _____

_____
_____

Beneficiaries
_____
_____

RESOURCES
• Welcome to LifeInsight
• Training Module
• Glossary of Terms
• How to Set a Baseline
• FAQ
• Prospectus and Monthly Performance Review

[–] Feedback

302

DISPLAY TOOL

CROSS-REFERENCE TO RELATED APPLICATION

This application is a continuation of U.S. patent application Ser. No. 17/120,734, now U.S. Pat. No. 11,210,311, filed on Dec. 14, 2020 and entitled "Display Tool," which is a continuation of U.S. patent application Ser. No. 16/507,993, now U.S. Pat. No. 10,896,190, filed Jul. 10, 2019 and entitled "Display Tool."

TECHNICAL FIELD

This disclosure relates generally to an improved graphical user interface.

BACKGROUND

In a variety of industries, it is standard practice for companies to provide information to their consumers and producers (agents who sell directly to consumers) in the form of multi-page documents. For example, customers commonly receive information about accounts, opportunities, and policies through such documents.

SUMMARY

In a variety of industries, it is standard practice for companies to provide information to their consumers and producers (agents who sell directly to consumers) in the form of multi-page documents. For example, consumers commonly receive information about accounts, opportunities, and policies through such documents. With the explosion of the Internet and the use of personal computers, companies have also begun to provide consumers and producers electronic access to the information contained in such documents, by developing graphical user interfaces through which the consumers and producers can view such information. However, such graphical user interfaces tend to be quite complex, given the large volume of data to which they provide access. Given the limited display area of a typical computer monitor, such graphical user interfaces are generally unable to present all the data contained in traditional multi-page documents to a user on a single display page. As a result, such graphical user interfaces frequently contain a large number of menus and linked pages that users may find difficult to navigate through. For example, if accessing a particular piece of information first requires a user to click through two menus and six links, the user may simply avoid accessing this information.

As discussed above, such issues exist in a variety of industries in which graphical user interfaces are used to present information traditionally contained in multi-page documents to producers and/or consumers. As a specific example, in the life insurance industry, companies traditionally provide information about their insurance policies to consumers and producers in the form of illustrations. For example, an "as sold" illustration provides information reflecting the original intent of the consumer in purchasing the policy, a "baseline" illustration provides information reflecting the current intent of the consumer, and an "in force" illustration provides information regarding the likely future performance of the policy over time, given the policy's actual, historic performance. Such illustrations are typically 20 to 30 pages in length and are filled with a large quantity of numbers and disclosures. Currently available graphical user interfaces are unable to display this information in an easy to understand format, making it difficult for producers to actively monitor the policies they have sold to consumers. This can lead to a variety of issues. For example, a producer may be unaware that a policy owner has initiated large withdrawals or loans against his/her policy that put the policy in danger of lapsing. Without such knowledge, the producer may be unable to counsel the policy owner about the effect of such actions in time to prevent the lapse.

This disclosure contemplates a display tool that addresses one or more of the above issues. This tool provides an improved graphical user interface for use in a variety of industries, through which a user can access a given piece of information provided by the graphical user interface directly from the main page of the interface (either by viewing the information directly on the main page of the graphical user interface, by following a single link, of a set of such links displayed on the main page, to the particular information, or by expanding an additional section of the interface, display on the main page).

While this disclosure contemplates the use of the display tool in any industry, for ease of explanation and understanding but not by way of limitation, this disclosure describes the tool as implemented for the life insurance industry. Such an implementation simplifies the process by which life insurance policy producers monitor the policies they have sold; rather than requiring producers to search through multiple complex documents stored at a variety of locations, accessible only by clicking through multiple links, the display tool provides a producer with any information the producer may want to know about a given policy directly from the main page of the graphical user interface for that particular policy. For example, in certain embodiments, the tool accesses information about a policy that is stored in a database and then uses this information to display the expected and historical values of the policy over time in an easy to understand, graphical format. This graphical information is presented to a user on a first region of a display. Various other regions of the display are used to provide links to other types of policy information. In this manner, certain embodiments of the tool provide an improved user interface that is easier to navigate than previous interfaces. Certain embodiments of the display tool are described below.

According to one embodiment, an apparatus includes a display, a memory, and a hardware processor communicatively coupled to the memory. The hardware processor accesses a database. The database includes a set of initial assumptions, a set of current assumptions, a set of values of a life insurance policy over time, a list of transactions, and a list of payments. The set of values of the life insurance policy over time includes an initial value and a current value. The processor displays on a first region of the display defined by a vertical price axis and a first horizontal time axis a baseline curve, a historical performance curve, and an in-force curve. The baseline curve includes a first series of points representing a first illustration of values for the life insurance policy over time. The first illustration is based on the set of initial assumptions and the initial value. The historical performance curve includes a second series of points representing the set of values of the life insurance policy over time. The in-force curve includes a third series of points representing a second illustration of values for the life insurance policy over time. The second illustration is based on the set of current assumptions and the current value. The processor further displays on a second region of the display located below the first region of the display and defined by a second horizontal time axis a fourth series of points representing the list of transactions. The processor also displays on a third region of the display located above the first region of the display the current value. The processor additionally displays on a fourth region of the display located below the second region of the display a first link to download a first file, a second link to display the set of current assumptions, a third link to download a second file, and a fourth link to display the set of initial assumptions. The first file includes an in-force illustration and the second file includes a baseline illustration. The in-force illustration includes the second illustration and the baseline illustration includes the first illustration. The processor further displays on a fifth region of the display located below the second region of the display and to the right of the fourth region of the display a fifth link to open an in-force illustrator used to generate an illustration, and a sixth link to create or update a new baseline. The processor also displays on a sixth region of the display located below the second region of the display and to the right of the fifth region of the display a seventh link to display the list of payments and an eighth link to display the list of transactions.

According to another embodiment, a method includes accessing a database. The database stores a set of initial assumptions, a set of current assumptions, a set of values of a life insurance policy over time, a list of transactions, and a list of payments. The set of values of the life insurance policy over time includes an initial value and a current value. The method also includes displaying on a first region of a display defined by a vertical price axis and a first horizontal time axis a baseline curve, a historical performance curve, and an in-force curve. The baseline curve includes a first series of points representing a first illustration of values for the life insurance policy over time. The first illustration is based on the set of initial assumptions and the initial value. The historical performance curve includes a second series of points representing the set of values of the life insurance policy over time. The in-force curve includes a third series of points representing a second illustration of values for the life insurance policy over time. The second illustration is based on the set of current assumptions and the current value. The method additionally includes displaying on a second region of the display located below the first region of the display and defined by a second horizontal time axis a fourth series of points representing the list of transactions. The method further includes displaying on a third region of the display located above the first region of the display the current value. The method also includes displaying on a fourth region of the display located below the second region of the display a first link to download a first file, a second link to display the set of current assumptions, a third link to download a second file, and a fourth link to display the set of initial assumptions. The first file includes an in-force illustration and the second file includes a baseline illustration. The in-force illustration includes the second illustration and the baseline illustration includes the first illustration. The method additionally includes displaying on a fifth region of the display located below the second region of the display and to the right of the fourth region of the display a fifth link to open an in-force illustrator used to generate an illustration and a sixth link to create or update a new baseline. The method further includes displaying on a sixth region of the display located below the second region of the display and to the right of the fifth region of the display a seventh link to display the list of payments, and an eighth link to display the list of transactions.

According to a further embodiment, a system includes a display, a storage element, and a processing element communicatively coupled to the storage element. The processing element is operable to access a database. The database stores a set of initial assumptions, a set of current assumptions, a set of values of a life insurance policy over time, comprising an initial value and a current value, a list of transactions, and a list of payments. The set of values of the life insurance policy over time includes an initial value and a current value. The processing element is further operable to display on a first region of the display defined by a vertical price axis and a first horizontal time axis a baseline curve, a historical performance curve, and an in-force curve. The baseline curve includes a first series of points representing a first illustration of values for the life insurance policy over time. The first illustration is based on the set of initial assumptions and the initial value. The historical performance curve includes a second series of points representing the set of values of the life insurance policy over time. The in-force curve includes a third series of points representing a second illustration of values for the life insurance policy over time. The second illustration is based on the set of current assumptions and the current value. The processing element is further operable to display on a second region of the display located below the first region of the display and defined by a second horizontal time axis a fourth series of points representing the list of transactions. The processing element is also operable to display on a third region of the display located above the first region of the display the current value. The processing element is additionally operable to display on a fourth region of the display located below the second region of the display a first link to download a first file, a second link to display the set of current assumptions, a third link to download a second file, and a fourth link to display the set of initial assumptions. The first file includes an in-force illustration and the second file includes a baseline illustration. The in-force illustration includes the second illustration and the baseline illustration includes the first illustration. In response to a user selecting the first link, the processing element is operable to save the first file in the storage element. In response to the user selecting the second link, the processing element is operable to display the set of current assumptions. In response to the user selecting the third link, the processing element is operable to save the second file in the storage element. In response to the user selecting the fourth link, the processing element is operable to display the set of initial assumptions. The processing element is further operable to display on a fifth region of the display located below the second region of the display and to the right of the fourth region of the display a fifth link to open an in-force illustrator used to generate an illustration and a sixth link to create or update a new baseline. The processing element is also operable to display on a sixth region of the display located below the second region of the display and to the right of the fifth region of the display a seventh link to display the list of payments and an eighth link to display the list of transactions. In response to the user selecting the seventh link, the processing element is operable to display the list of payments. In response to the user selecting the eighth link, the processing element is operable to display the list of transactions.

Certain embodiments provide one or more technical advantages. For example, an embodiment enables policy producers to access all relevant information about an insurance policy they have sold using a single graphical user interface, rather than having to search through multiple documents and pages. As another example, an embodiment provides graphical representations of insurance policy illustrations that are easier to understand than the tables and lists of numbers that are traditionally used in the industry. As a further example, an embodiment provides a policy producer with up to date information about the policies he/she has sold, each time he/she uses the tool. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which:

FIGS. 2A and 2B provide a comparison between a traditional policy illustration and a graphical depiction of the policy illustration information generated by the system of FIG. 1;

FIG. 5 presents an example of the information displayed on the graphical user interface of FIG. 3 in response to a user selecting a link to display a set of assumptions;

FIG. 6 presents an example of the information displayed on the graphical user interface of FIG. 3 in response to a user selecting a link to display a list of payments;

FIG. 8 presents an example of a form displayed on the graphical user interface of FIG. 3 in response to a user selecting a link to create an illustration;

FIG. 12 presents an example of the information displayed on the graphical user interface of FIG. 3 in response to a user selecting a notification link;

DETAILED DESCRIPTION

Figure 1:
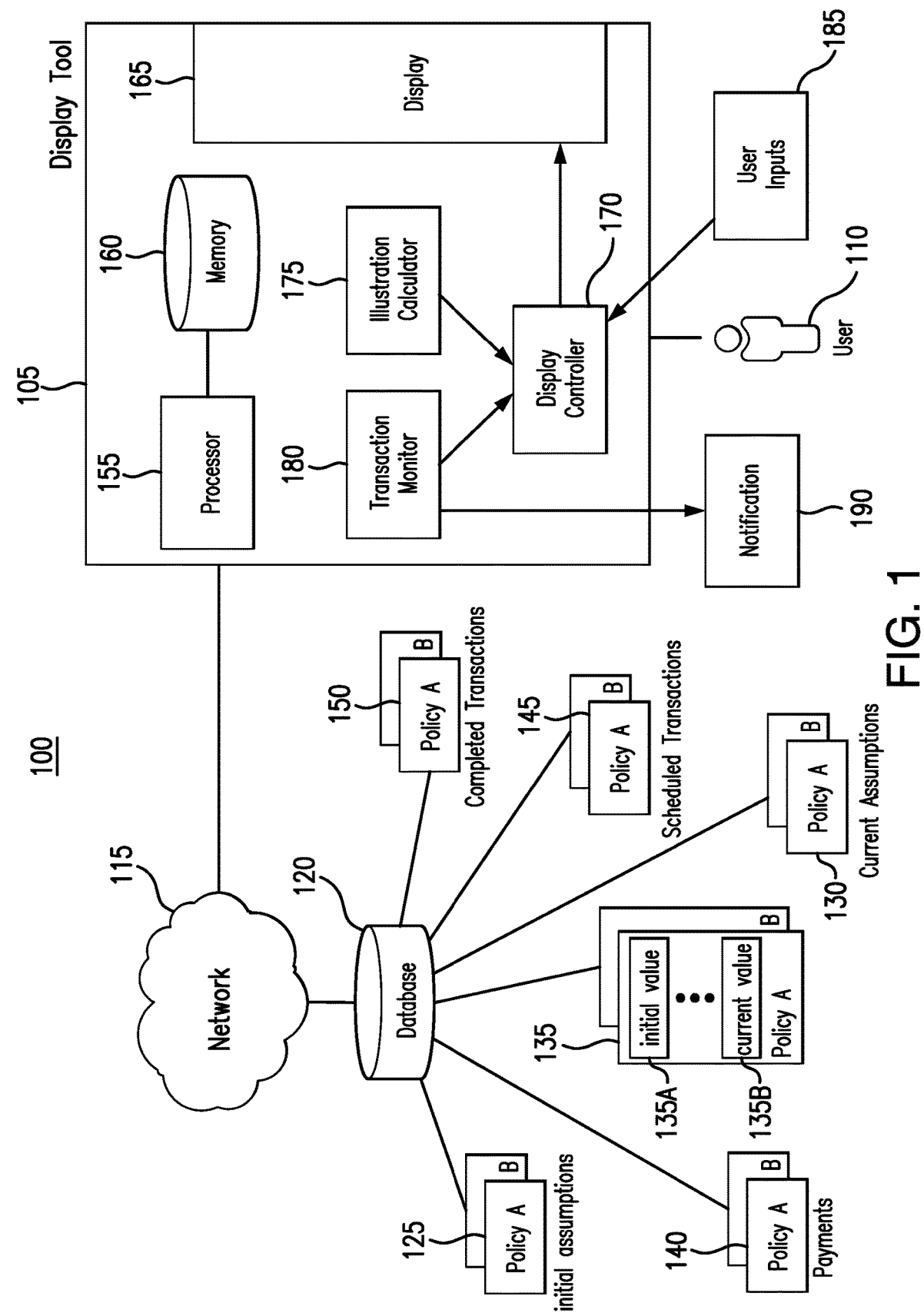
FIG. 1 illustrates an example system.

Embodiments of the present disclosure and its advantages are best understood by referring to FIGS. 1 through 14 of the drawings, like numerals being used for like and corresponding parts of the various drawings.

In a variety of industries, it is standard practice for companies to provide information to their consumers and producers (agents who sell directly to consumers) in the form of multi-page documents. For example, consumers commonly receive information about accounts, opportunities, and policies through such documents. With the explosion of the Internet and the use of personal computers, companies have also begun to provide consumers and producers electronic access to the information contained in such documents, by developing graphical user interfaces through which the consumers and producers can view such information. However, such graphical user interfaces tend to be quite complex, given the large volume of data to which they provide access. Given the limited display area of a typical computer monitor, such graphical user interfaces are generally unable to present all the data contained in traditional multi-page documents to a user on a single display page. As a result, such graphical user interfaces frequently contain a large number of menus and linked pages that users may find difficult to navigate through. For example, if accessing a particular piece of information first requires a user to click through two menus and six links, the user may simply avoid accessing this information.

As discussed above, such issues exist in a variety of industries in which graphical user interfaces are used to present information traditionally contained in multi-page documents to producers and/or consumers. As a specific example, in the life insurance industry, companies traditionally provide information about their insurance policies to consumers and producers in the form of illustrations. For example, an "as sold" illustration provides information reflecting the original intent of the consumer in purchasing the policy, a "baseline" illustration provides information reflecting the current intent of the consumer, and an "in force" illustration provides information regarding the likely future performance of the policy over time, given the policy's actual, historic performance. Such illustrations are typically 20 to 30 pages in length and are filled with a large quantity of numbers and disclosures. Currently available graphical user interfaces are unable to display this information in an easy to understand format, making it difficult for producers to actively monitor the policies they have sold to consumers. This can lead to a variety of issues. For example, a producer may be unaware that a policy owner has initiated large withdrawals or loans against his/her policy that put the policy in danger of lapsing. Without such knowledge, the producer may be unable to counsel the policy owner about the effect of such actions in time to prevent the lapse.

This disclosure contemplates a display tool that addresses one or more of the above issues. This tool provides an improved graphical user interface for use in a variety of industries, through which a user can access a given piece of information provided by the graphical user interface directly from the main page of the interface (either by viewing the information directly on the main page of the graphical user interface, by following a single link, of a set of such links displayed on the main page, to the particular information, or by expanding an additional section of the interface, display on the main page).

While this disclosure contemplates the use of the display tool in any industry, for ease of explanation and understanding but not by way of limitation, this disclosure describes the tool as implemented for the life insurance industry. Such an implementation simplifies the process by which life insurance policy producers monitor the policies they have sold; rather than requiring producers to search through multiple complex documents stored at a variety of locations, accessible only by clicking through multiple links, the display tool provides a producer with any information the producer may want to know about a given policy directly from the main page of the graphical user interface for that particular policy. For example, in certain embodiments, the tool accesses information about a policy that is stored in a database and then uses this information to display the expected and historical values of the policy over time in an easy to understand, graphical format. This graphical information is presented to a user on a first region of a display. Various other regions of the display are used to provide links to other types of policy information. In this manner, certain embodiments of the tool provide an improved user interface that is easier to navigate than previous interfaces. The display tool will be described in more detail using FIGS. 1 through 14.

FIG. 1 illustrates an example system 100. As seen in FIG. 1, system 100 includes a network 115, a database 120, a user 110, and a display tool 105. Generally, display tool 105 accesses database 120 over network 115 to obtain information about a life insurance policy A. Display tool 105 then presents this information to user 110 in the form of a graphical user interface displayed on display 165. The format and components of the graphical user interface are described in detail below, in the discussion of FIGS. 3 through 14.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 120 stores information about a group of life insurance policies that producers have sold to consumers. Specifically, for a given life insurance policy A, database 120 stores initial assumptions 125 that capture a policy owner's expectations regarding policy A on the date of inception, which are used to generate a baseline policy illustration for policy A, current assumptions 130 used to determine an in-force policy illustration for policy A, policy values 135 of life insurance policy A over time, including initial value 135A and current value 135B, a list of payments 140 that a consumer has applied to policy A, a list of scheduled transactions 145 that a consumer is scheduled to perform on policy A, and a list of completed transactions 150 that a consumer has performed on policy A.

This disclosure contemplates that the set of initial assumptions 125 and the set of current assumptions 130 can include values such as the desired death benefit, the desired rate of return, the policy premium, desired distributions from the policy, and included policy riders. In certain embodiments, the set of initial assumptions 125 and the set of current assumptions 130 are the same. This may occur when a policy consumer has not sought to change any of the attributes of his/her policy during the lifetime of the policy.

As seen in FIG. 1, display tool 105 includes a processor 155, a memory 160, and a display 165. This disclosure contemplates processor 155 and memory 160 being configured to perform any of the functions of display tool 105 described herein. Generally, display tool 105 implements display controller 170 and illustration calculator 175. In certain embodiments, display tool 105 also implements transaction monitor 180.

Illustration calculator 175 uses initial assumptions 125 and initial policy value 135A to determine a first series of points representing a first illustration of values for life insurance policy A over time, from the policy inception date to a future date. Illustration calculator 175 also uses current assumptions 130 and current policy value 135B to determine a second series of points representing a second illustration of values for life insurance policy A over time, from the current date to a future date. Illustration calculator 175 then passes the first illustration and the second illustration to display controller 170, which displays a baseline curve including the first series of points and an in-force curve including the second series of points on a first region of display 165.

Illustration calculator 175 may be a software module stored in memory 160 and executed by processor 155. An example algorithm for illustration calculator 175 is as follows: access database 120; copy initial assumptions 125 and initial value 135A for policy A from database 120 and store these values in memory 160; evenly split a date range starting from the policy inception date to a given future date into a set number intervals, each interval associated with a starting date; for each of the set number of intervals: {determine the expected value of policy A on the starting date associated with the interval, given initial value 135A and initial assumptions 125; send the expected value to display controller 170}; access database 120; copy current assumptions 130 and current value 135B for policy A from database 120 and store these values in memory 160; evenly split a date range starting from the current date to a given future date into a set number of intervals, each interval associated with a starting date; for each of the set number of intervals: {determine the expected value of policy A on the starting date associated with the interval, given the current value 135B and current assumptions 130; send the expected value to display controller 170}; delete the copies of initial assumptions 125, initial value 135A, current assumptions 130 and current value 135B stored in memory 160.

In certain embodiments, in response to receiving various inputs 185 from user 110, illustration calculator 175 additionally generates a traditional illustration document, as discussed in further detail below, in the discussion of FIG. 8; updates baseline curve 310, as discussed in further detail below, in the discussion of FIG. 9; and/or determines the effect of hypothetical changes in policy parameters on in-force curve 314, as discussed in further detail below, in the discussion of FIG. 10.

Display controller 170 receives information from database 120 and illustration calculator 175, along with user inputs 185, and uses this information to display a graphical user interface on display 165. For example, in certain embodiments, display controller 170 receives a first series of points representing a first illustration of values for life insurance policy A over time, from the policy inception date to a future date, and a second series of points representing a second illustration of values for life insurance policy A over time, from the current date to a future date, from illustration calculator 175, along with policy values 130 from database 120. Display controller 170 then uses this information to display a baseline curve, an in-force curve, and a historical performance curve in a first region of display 165. In addition, display controller 170 displays links to further policy information on various other regions of display 165. A detailed description of the types of policy information and links displayed by display controller 170 on display 165 is presented below, in the discussion of FIGS. 3 and 4. In certain embodiments, display controller 170 additionally causes display 165 to present further information about policy A in response to user 110 selecting one of the links displayed by display controller 170 on display 165. In certain further embodiments, display controller 170 additionally causes display 165 to present further information about policy A in response to user 110 expanding one or more regions of display 165. A detailed description of the types of further policy information presented on display 165 in response to user 110 selecting one of the links displayed by display controller 170 on display 165 is provided below, in the discussion of FIGS. 5 through 11.

Display controller 170 may be a software module stored in memory 160 and executed by processor 155. An example algorithm for display controller 170 is as follows: receive a first series of points representing a first illustration of values for life insurance policy A on a first set of dates and a second series of points representing a second illustration of values for life insurance policy A on a second set of dates, from illustration calculator 175; display the first series of points and the second series of points in a first region of display 165; access database 120; copy those policy values 130 from database 120 for dates that coincide with the first set of dates; display the copied policy values 130 in the first region of display 165; display a set of links to additional policy information on display 165; in response to a user selecting a link to display additional policy information, display the additional policy information associated with the link on display 165.

In certain embodiments, display tool 105 also includes transaction monitor 180. In certain such embodiments, transaction monitor 180 monitors completed transactions 150 stored in database 120. If transaction monitor 180 determines that a transaction stored in completed transactions 150 is not included in the list of scheduled transactions 145 stored in database 120, transaction monitor 180 communicates this information to display controller 170, which causes display 165 to display a first notification on a region of display 165 to the left of the first region. In further embodiments, transaction monitor 180 determines that a transaction in the list of scheduled transactions 145 is set to occur within a given period of time. Transaction monitor 180 then communicates this information to display controller 170, which causes display 165 to display a second notification on the region of display 165 to the left of the first region. In certain embodiments the first notification and the second notification displayed by display controller 170 on display 165 correspond to links that a user 110 can select to obtain information either about the unscheduled transaction, in the case of the first link, or the upcoming transaction, in the case of the second link. In certain embodiments, display controller 170 causes display 165 to display only a single notification link regardless of the number of notifications communicated to display controller 170 by transaction monitor 180.

In certain embodiments, in addition to causing display controller 170 to display a notification on display 165, transaction monitor 180 sends a message 190 to user 110 containing the notification. This disclosure contemplates that message 190 can be an SMS text message, an electronic mail message, an application push-notification message, or any other type of electronic message communicated by display tool 105 to user 110. Sending message 190 to user 110 in addition to displaying a notification link on display 165 may be desirable for those users 110 who do not regularly view the graphical user interface of display tool 105. Providing messages 190 to such users 110 in addition to displaying a notification link on the graphical user interface, will likely provide such users 110 with additional time during which they can contact policy owners to warn them about the risk of their policies lapsing and/or notify them that they should take distributions from their policies prior to the lapse and/or scheduled distribution date.

Transaction monitor 180 may be a software module stored in memory 160 and executed by processor 155. An example algorithm for transaction monitor 180 is as follows: access database 120; compare the list of completed transactions 150 to the list of scheduled transactions 145; determine that a transaction in the list of completed transactions 150 is not in the list of scheduled transactions 145; communicate to display controller 170 that an unscheduled transaction has occurred, along with the details of the unscheduled transaction; determine that a transaction in the list of scheduled transactions 145 is set to occur within a given period of time; communicate to display controller 170 that a scheduled transaction is set to occur, along with the details of the scheduled transaction.

Processor 155 is any electronic circuitry, including, but not limited to microprocessors, application specific integrated circuits (ASIC), application specific instruction set processor (ASIP), and/or state machines, that communicatively couples to memory 160 and controls the operation of display tool 105. Processor 155 may be 8-bit, 16-bit, 32-bit, 64-bit or of any other suitable architecture. Processor 155 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 155 may include other hardware and software that operates to control and process information. Processor 155 executes software stored on memory to perform any of the functions described herein. Processor 155 controls the operation and administration of display tool 105 by processing information received from network 115, user 110, and memory 160. Processor 155 may be a programmable logic device, a microcontroller, a microprocessor, any suitable processing device, or any suitable combination of the preceding. Processor 155 is not limited to a single processing device and may encompass multiple processing devices.

Memory 160 may store, either permanently or temporarily, data, operational software, or other information for processor 155. Memory 160 may include any one or a combination of volatile or non-volatile local or remote devices suitable for storing information. For example, memory 160 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 160, a disk, a CD, or a flash drive. In particular embodiments, the software may include an application executable by processor 155 to perform one or more of the functions described herein.

Display 165 is a screen used by display tool 105 to display information stored in database 120 and/or generated from information stored in database 120. Display tool 105 displays this information on display 165 in the form of a graphical user interface. In certain embodiments, display 165 is a standard display used in a laptop computer. In certain other embodiments, display 165 is an external display device connected to a laptop or desktop computer. In further embodiments, display 165 is a standard touch-screen liquid crystal display found in a typical smartphone or tablet.

In certain embodiments, display tool 105 provides policy producers with easily accessible information about the life insurance policies they manage, by presenting this information in the form of an unconventional graphical user interface on display 165. This graphical user interface displays graphical representations of the expected performance of the policy over time—starting from the date of policy inception—along with the actual performance of the policy, and a illustration for future policy performance in a first region of display 165. Such graphical representations are easier to understand than the tables and lists of numbers that typically make up the policy illustrations that are traditionally presented to producers in the life insurance industry. The graphical user interface also displays various links to additional policy information in further regions of display 165, enabling a user 110 to access all relevant information about a policy directly from the main page of the graphical user interface, rather than having to search through multiple documents and pages stored at various locations for such information, as was traditionally the case.

Figure 2A:
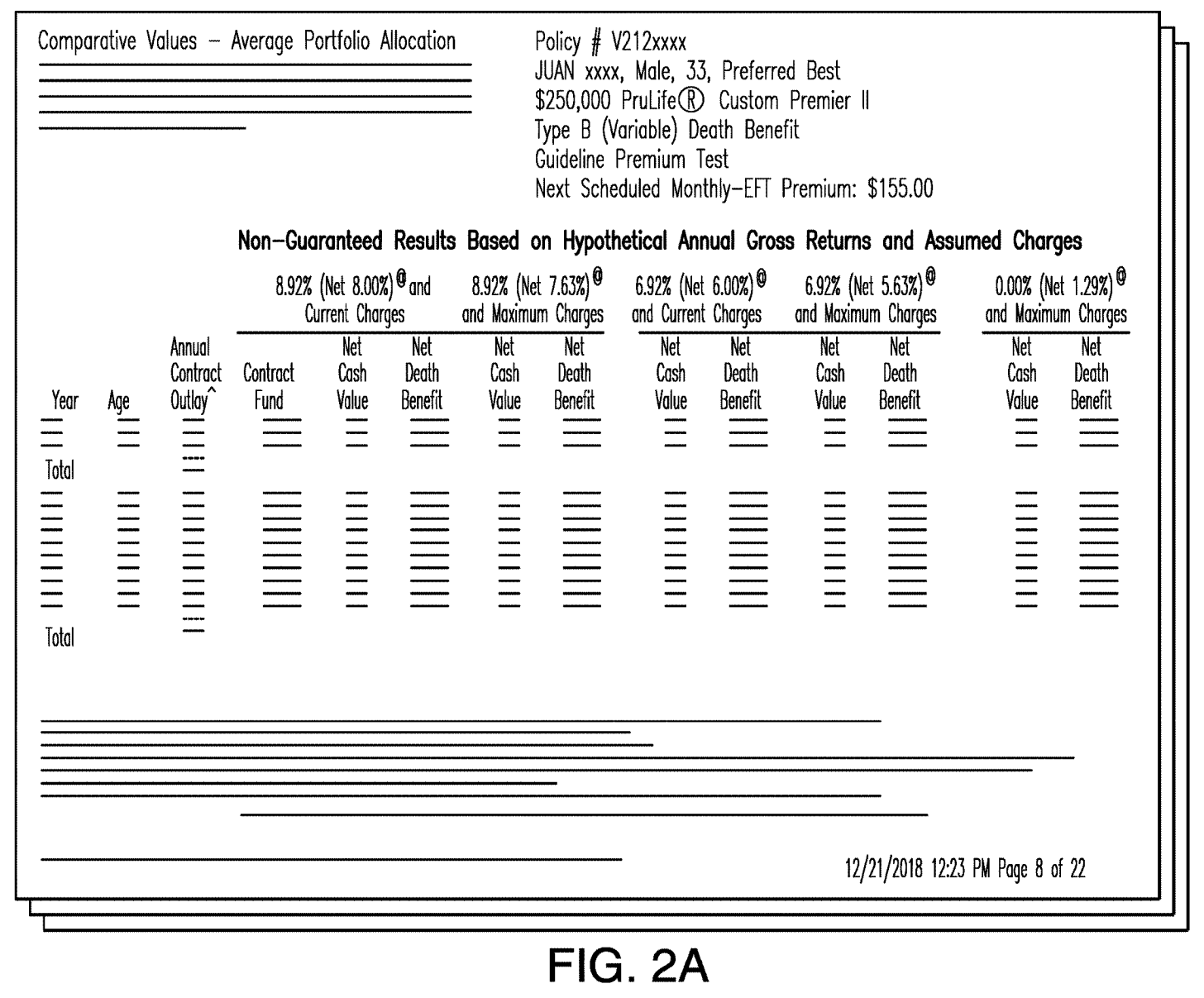
Figure 2B:
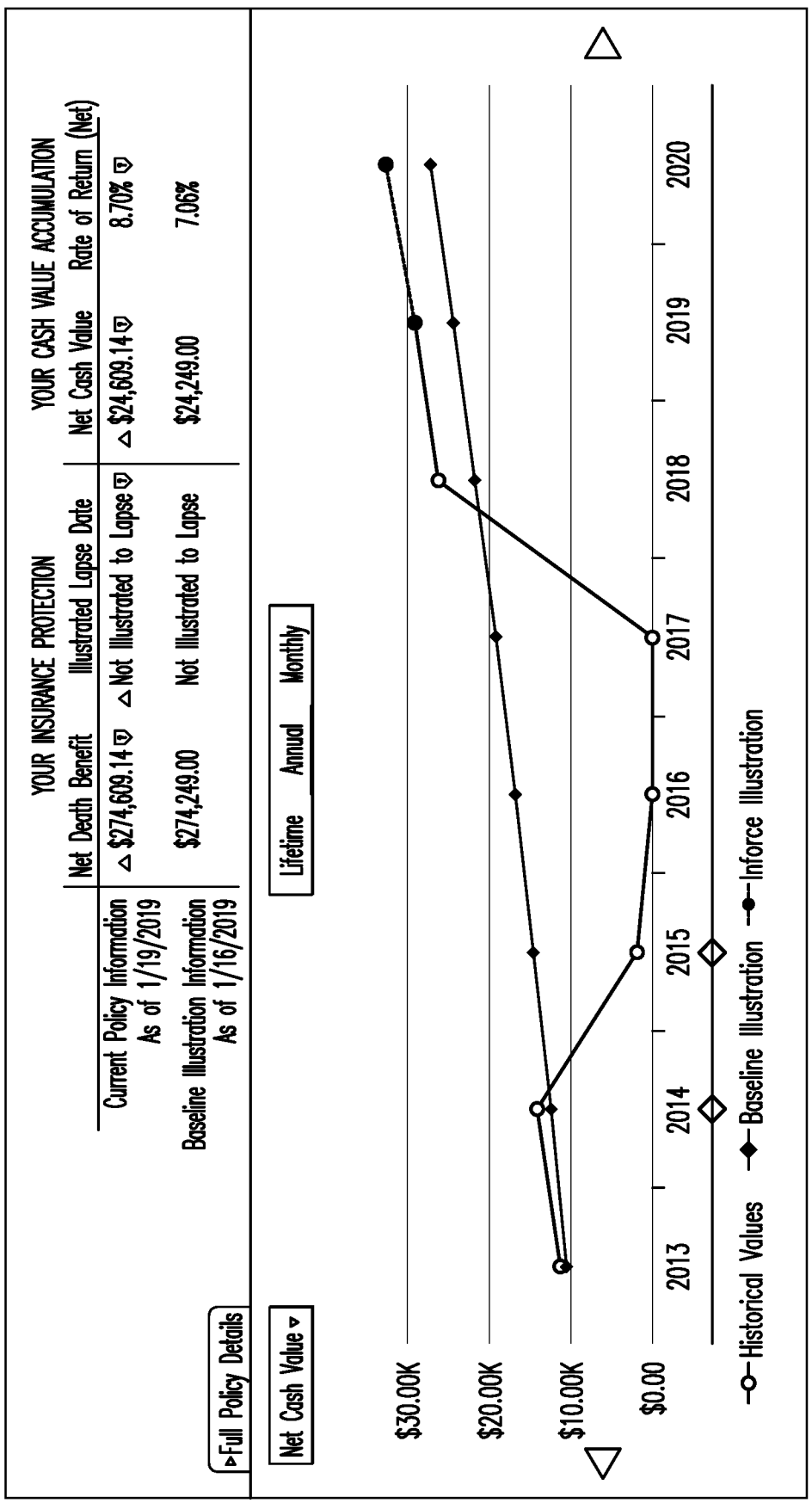

FIGS. 2A and 2B provide a comparison between a traditional life insurance policy illustration and an example graphical depiction of information contained in such an illustration, as generated by display tool 105 of FIG. 1. As can be seen in FIG. 2A, life insurance policy information is typically presented to producers through multi-page life insurance policy illustrations, which each contain various numbers and tables. On the other hand, FIG. 2B presents an example graphical depiction of life insurance policy information as generated by display tool 105. From a comparison of these two presentation types, it is reasonable to assume that a producer will spend considerably more time analyzing the data presented in FIG. 2A to obtain the basic understanding of the behavior of a life insurance policy that he/she could obtain simply by glancing at the data presented in FIG. 2B.

Figure 3:
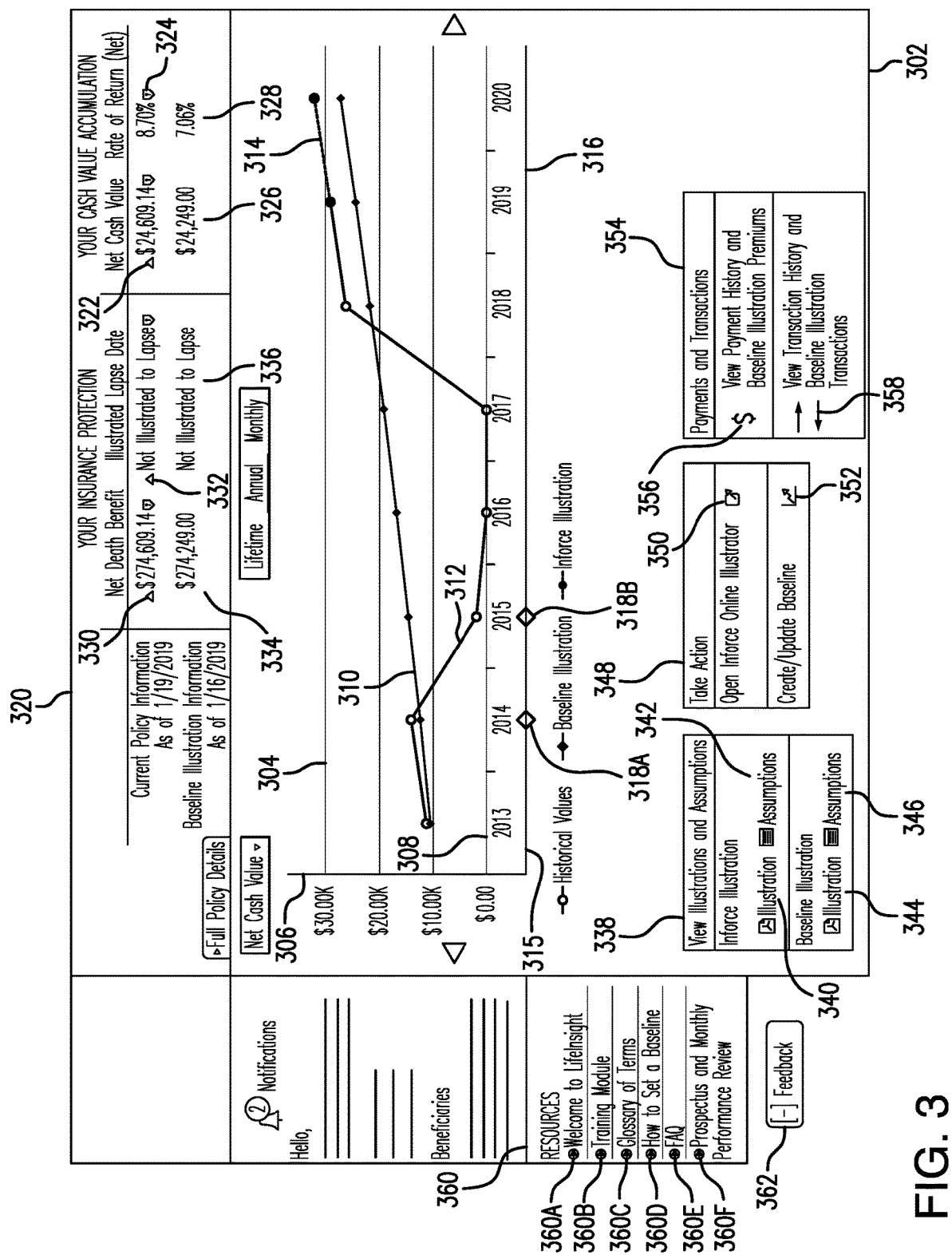
FIG. 3 presents an example graphical user interface generated by the system of FIG. 1.

FIG. 3 presents an example graphical user interface 302 displayed by display tool 105 on display 165. Graphical user interface 302 includes a first region 304 of display 165 defined by a vertical price axis 306 and a first horizontal time axis 308. First region 304 includes a baseline curve 310, a historical performance curve 312, and an in-force curve 314. Baseline curve 310 includes a first series of points representing a first illustration of values for the life insurance policy over time, where the first illustration is based on the set of initial assumptions 125 and the initial value 135A of the policy. Historical performance curve 312 includes a second series of points representing the set of values 135 of the life insurance policy over time. In-force curve 314 includes a third series of points representing a second illustration of values for the life insurance policy over time, where the second illustration is based on the set of current assumptions 130 and the current value 135B of the policy. In-force curve 314 will likely be different from baseline curve 310 in situations in which a policy owner has modified current assumptions 130 from initial assumptions 125 and/or performed unscheduled transactions with his/her policy.

This disclosure contemplates that the set of initial assumptions 125 and the set of current assumptions 130 can include values such as the desired death benefit, the desired rate of return, the policy premium, desired distributions from the policy, and included policy riders. In certain embodiments, the set of initial assumptions 125 and the set of current assumptions 130 are the same. This may occur when a policy consumer has not sought to change any of the attributes of his/her policy during the lifetime of the policy.

Graphical user interface 302 also includes a second region 315 located below first region 304 and defined by a second horizontal time axis 316 of the same scale as first horizontal time axis 308. Second region 315 includes a fourth series of points 318A and 318B representing transactions from the list of completed transactions 150. By illustrating the timings of completed transactions, display tool 105 enables a user 110 to easily understand the causes of any unexpected deviations of the historical performance curve 312 from the baseline curve 310.

Above first region 304, graphical user interface 302 also includes a third region 320 of display 165. Third region 320 includes current value 322 of the life insurance policy. In certain embodiments, third region 320 includes additional up-to-date information about the life insurance policy, including a current rate of return 324 of the life insurance policy, a current net death benefit amount 330 for the life insurance policy, and a predicted lapse date (if any) 332 for the life insurance policy determined from the in-force illustration curve 314. In certain embodiments, third region 320 also includes information that provides a comparison between the actual performance of the policy and the excepted performance of the policy, based on the consumer's intentions on the date of the policy inception. For example, third region 320 may additionally include a current expected value 326 of the policy determined from the baseline illustration curve 310, a current expected rate of return 328 of the policy determined from the current expected value 326, a current expected net death benefit amount 334 determined from the initial assumptions 125, and an expected lapse date (if any) 336 for the life insurance policy determined from the baseline curve 310. This comparison enables a producer to clearly see the impact of any unscheduled transactions and/or modifications in policy assumptions that a policy owner has made on the current value of his/her policy. In certain embodiments, graphical user interface 302 can expand third region 320 to display additional policy information, in response to a user 110 clicking to access a drop-down section of third region 320.

Below second region 315, graphical user interface 302 includes a fourth region 338, a fifth region 348, and a sixth region 354, each of which include a series of links that user 110 can select to obtain additional information about the life insurance policy. For example, fourth region 338 includes a first link 340 to download a first file that includes the in-force illustration document for the policy and a second link 342 to display the set of current assumptions 130 for the policy. Fourth region 338 also includes a third link 344 to download a second file that includes the baseline illustration document and a fourth link 346 to display the set of initial assumptions 125 used to generate the baseline illustration. The behavior of display tool 105 in response to user 110 selecting either second link 342 or fourth link 346 is described in detail below, in the discussion of FIG. 5.

To the right of fourth region 338, graphical user interface 302 includes fifth region 348. Fifth region 348 includes a fifth link 350 to open an in-force illustrator application and a sixth link 352 to create or update a new baseline curve. The in-force illustrator application is used to generate a traditional illustration document. The behavior of display tool 105 in response to a user selecting fifth link 350 is described in detail below in the discussion of FIG. 8, and the behavior of display tool 105 in response to user 110 selecting sixth link 352 is described in detail below in the discussion of FIG. 9.

To the right of fifth region 348, graphical user interface 302 includes sixth region 354. Sixth region 354 includes a seventh link 356 to display the list of payments 140, and an eighth link 358 to display the list of scheduled transactions 145 and the list of complete transactions 150. The behavior of display tool 105 in response to a user selecting seventh link 356 is described in detail below in the discussion of FIG. 6 and the behavior of display tool 105 in response to a user selecting eighth link 358 is described in detail below in the discussion of FIG. 7.

In certain embodiments, graphical user interface 302 additionally includes a seventh region 360 to the left of first region 304. Seventh region 360 displays a series of links 360A through 360F to resources that are available to producers. For example, link 360A provides a link to general information about graphical user interface 302, link 360B provides a link to a training module that provides training on the use of graphical user interface 302, link 360C provides a link to a glossary of terms, link 360D provides a link to instructions on how to set a new baseline curve 310 in first region 304, link 360E provides a link to a set of frequently asked questions and answers, and link 360F provides a link to a prospectus and monthly performance review.

In certain further embodiments, graphical user interface 302 includes a feedback link 362 located below seventh region 352. In response to a user 110 selecting feedback link 362, display tool 105 displays a form on display 165 into which user 110 can enter and submit feedback about graphical user interface 302 for receipt by an administrator of display tool 105.

By providing a producer access to a wide variety of policy information directly from the main page of graphical user interface 302 (either by displaying the information directly on the main page or providing a link to the information on the main page), display tool 105 greatly simplifies the manner in which the producer accesses information about a given policy, thereby enabling the producer to more efficiently monitor his/her policies.

Figure 4:
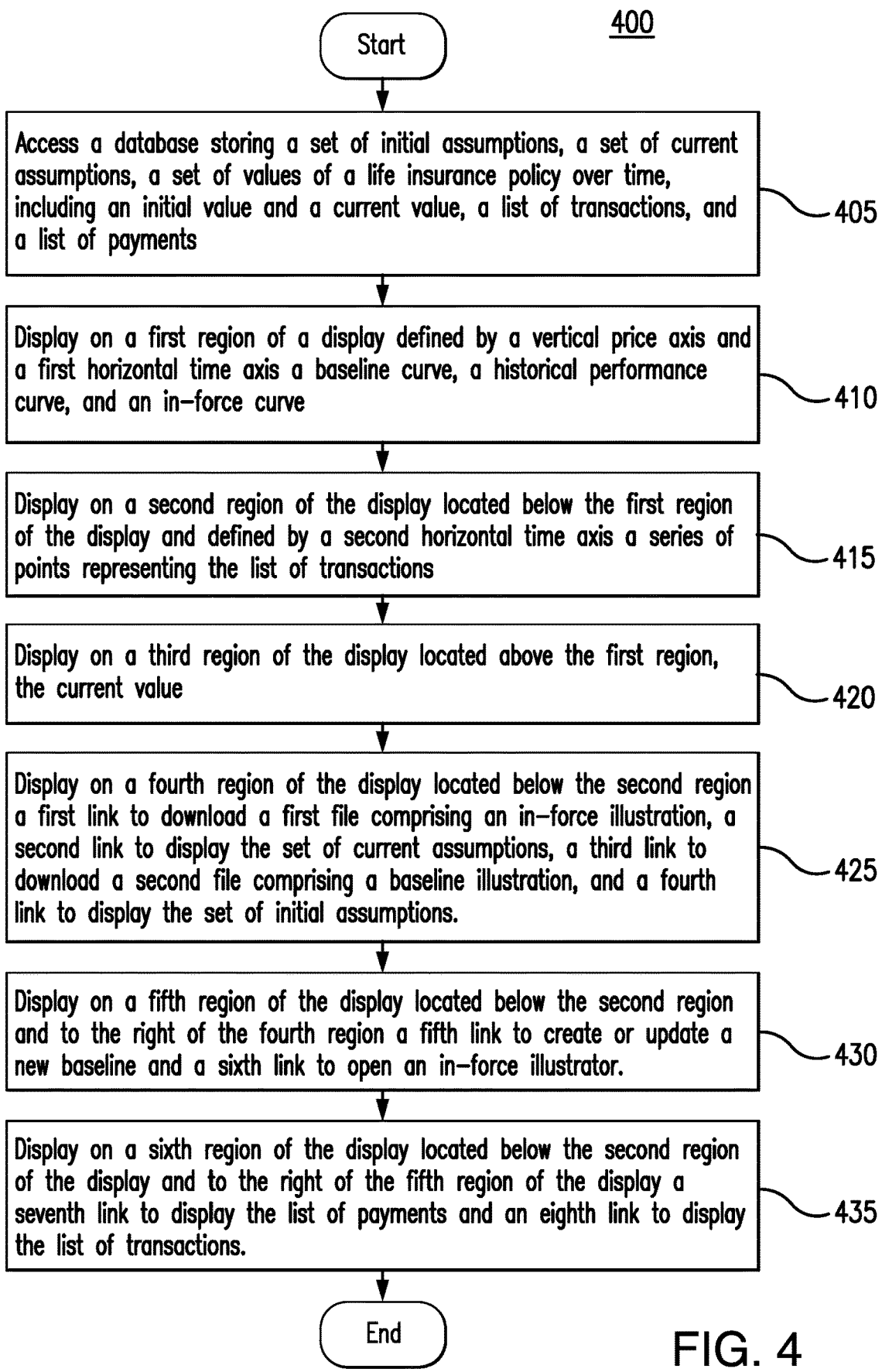
FIG. 4 presents a flowchart illustrating the process by which the system of FIG. 1 displays the graphical user interface of FIG. 3 on a display.

FIG. 4 illustrates the process by which the system of FIG. 1 displays the main page of graphical user interface 302 on display 165. In step 405, display tool 105 accesses a database 120 storing a set of initial assumptions 125, a set of current assumptions 130, a set of values of a life insurance policy over time 135 (including an initial value 135A and a current value 135B), a list of transactions (including both scheduled transactions 145 and completed transactions 150), and a list of payments 140. Using this information, in step 410, display tool 105 displays on a first region 304 of display 165 defined by a vertical price axis 306 and a first horizontal time axis 308 a baseline curve 310, a historical performance curve 312, and an in-force curve 314. Next, in step 415, display tool 105 displays on a second region 315 of display 165 located below first region 304 of display 165 and defined by a second horizontal time axis 316 a series of points 318A and 318B representing the list of completed transactions 150. Display tool 105 then displays on a third region 320 of display 165 located above first region 304 the current value 322 of the life insurance policy in step 420. In step 425, display tool 105 displays on a fourth region 338 of display 165 located below second region 315 a first link 340 to download a first file comprising an in-force illustration, a second link 342 to display the set of current assumptions 130, a third link 344 to download a second file comprising a baseline illustration, and a fourth link 346 to display the set of initial assumptions 125. Next, in step 430, display tool 105 displays on a fifth region 348 of display 165 located below second region 315 and to the right of fourth region 338 a fifth link 350 to open an in-force illustrator and a sixth link 352 to create or update a new baseline. The in-force illustrator is used to generate a traditional illustration document. Finally, in step 435, display tool 105 displays on a sixth region 354 of display 165 located below second region 315 of display 165 and to the right of fifth region 348 of display 165 a seventh link 356 to display the list of payments 140 and an eighth link 358 to display a list of transactions, including both scheduled transactions 145 and completed transaction 150.

In certain embodiments, method 400 contains additional steps, during which display tool 105 displays additional information on display 165. For example, in certain embodiments, display tool 105 also displays in third region 320 of display 165 additional up-to-date information about the life insurance policy, including a current rate of return 324 of the life insurance policy, a current net death benefit amount 330 for the life insurance policy, and a predicted lapse date (if any) 332 for the life insurance policy determined from the in-force illustration curve 314. In certain embodiments, display tool 105 also displays in third region 320 of display 165 information that provides a comparison between the actual performance of the policy and the expected performance of the policy, based on the consumer's intentions on the date of the policy inception. For example, display tool 105 may additionally display in third region 320 a current expected value 326 of the policy determined from the baseline illustration curve 310, a current expected rate of return 328 of the policy determined from the current expected value 326, a current expected net death benefit amount 334 determined from initial assumptions 125, and an expected lapse date (if any) 336 for the life insurance policy. This comparison enables a producer to clearly see the effect of any unscheduled transactions and/or modifications in policy assumptions that their client has made on the current value of their policy. In certain further embodiments, graphical user interface 302 can expand third region 320 to display additional policy information, in response to a user 110 clicking to access a drop-down section of third region 320.

In certain other embodiments, display tool 105 additionally displays a seventh region 352 to the left of first region 304. Seventh region 360 includes a series of links 360A through 360F to resources that are available to producers. For example, link 360A provides a link to general information about graphical user interface 302, link 360B provides a link to a training module that provides training on the use of graphical user interface 302, link 360C provides a link to a glossary of terms, link 360D provides a link to instructions on how to set a new baseline curve 310 in first region 304, link 360E provides a link to a set of frequently asked question and answers, and link 360F provides a link to a prospectus and monthly performance review.

In certain further embodiments, display tool 105 also displays a feedback link 362 located below seventh region 352. In response to a user 110 selecting feedback link 362, display tool 105 displays a form on display 165 into which user 110 can enter and submit feedback about graphical user interface 302 for receipt by an administrator of display tool 105.

Modifications, additions, or omissions may be made to method 400 depicted in FIG. 4. Method 400 may include more, fewer, or other steps. For example, steps may be performed in parallel or in any suitable order. While discussed as display tool 105 (or components thereof) performing the steps, any suitable component of system 100 may perform one or more steps of the method.

FIGS. 5 through 11 illustrate the behavior of display tool 105 in response to user 110 selecting one of the various links displayed on the main page of graphical user interface 302.

FIG. 5 presents an example of the type of information displayed by display tool 105 on graphical user interface 302 in response to a user 110 selecting second link 342 to view in-force illustration assumptions. When a user 110 selects second link 342, display tool 105 displays second page 505 on display 165, where second page 505 contains the set of current assumptions 130. In certain embodiments, the set of current assumptions 130 includes a death benefit 510, a rate of return 515, premium payment amounts 520, distribution amounts 525, and included riders 530. Through second link 342, this information is accessible to a user 110 directly from the main page of graphical user interface 302. This may be desirable given that display tool 105 uses the set of current assumptions 130 to determine the in-force illustration curve 314. Therefore, a producer may select second link 324 to help him/her understand the behavior of in-force illustration curve 314, or to provide a policy owner information about the current assumptions 130 underlying the owner's life insurance policy. Once user 110 is finished with this information, he/she can simply select button 535, which closes second page 505, to return to the main page of graphical user interface 302.

In a similar manner, when a user 110 selects fourth link 346, display tool displays a third page containing the set of initial assumptions 125 on display 165. This disclosure contemplates that the third page is of the same format as second page 505 illustrated in FIG. 5; the third page simply illustrates initial assumptions 125 rather than current assumptions 130 and refers to the "baseline illustration" rather than the "inforce illustration." In certain embodiments, the set of initial assumptions 125 displayed on the third page and the set of current assumptions 130 displayed on second page 505 have the same values. This may occur when a policy consumer has not sought to change any of the attributes of his/her policy during the lifetime of the policy.

FIG. 6 presents an example of the type of information displayed by display tool 105 on graphical user interface 302 in response to a user 110 selecting seventh link 356 to view a consumer's payment history. When a user 110 selects seventh link 356, display tool 105 displays fourth page 605 on display 165, where fourth page 605 contains the list of payments 140. In certain embodiments, the list of payments 140 is displayed in payment history region 610. In such embodiments, for each payment in the list of payments 140, display tool 105 displays the payment date 610A, the payment type 610B, and the payment amount 610C, in payment history region 610. Examples of payment types include premium payments and loan repayments. In certain embodiments, life insurance policy 105 additionally displays baseline illustration premium schedule 615 on fourth page 605. By displaying baseline illustration premium schedule 615 along with payment history region 610, display tool 105 enables a user 110 to compare the payments a policy owner has made to his/her life insurance policy with the payments the policy owner was scheduled to make (according to the baseline illustration), thereby easily identifying any discrepancies. Once user 110 is finished with the policy owner's payment history, displayed in payment history region 610 on fourth page 605, he/she can easily return to the main page of graphical user interface 302, simply by selecting back button 620.

Figure 7:
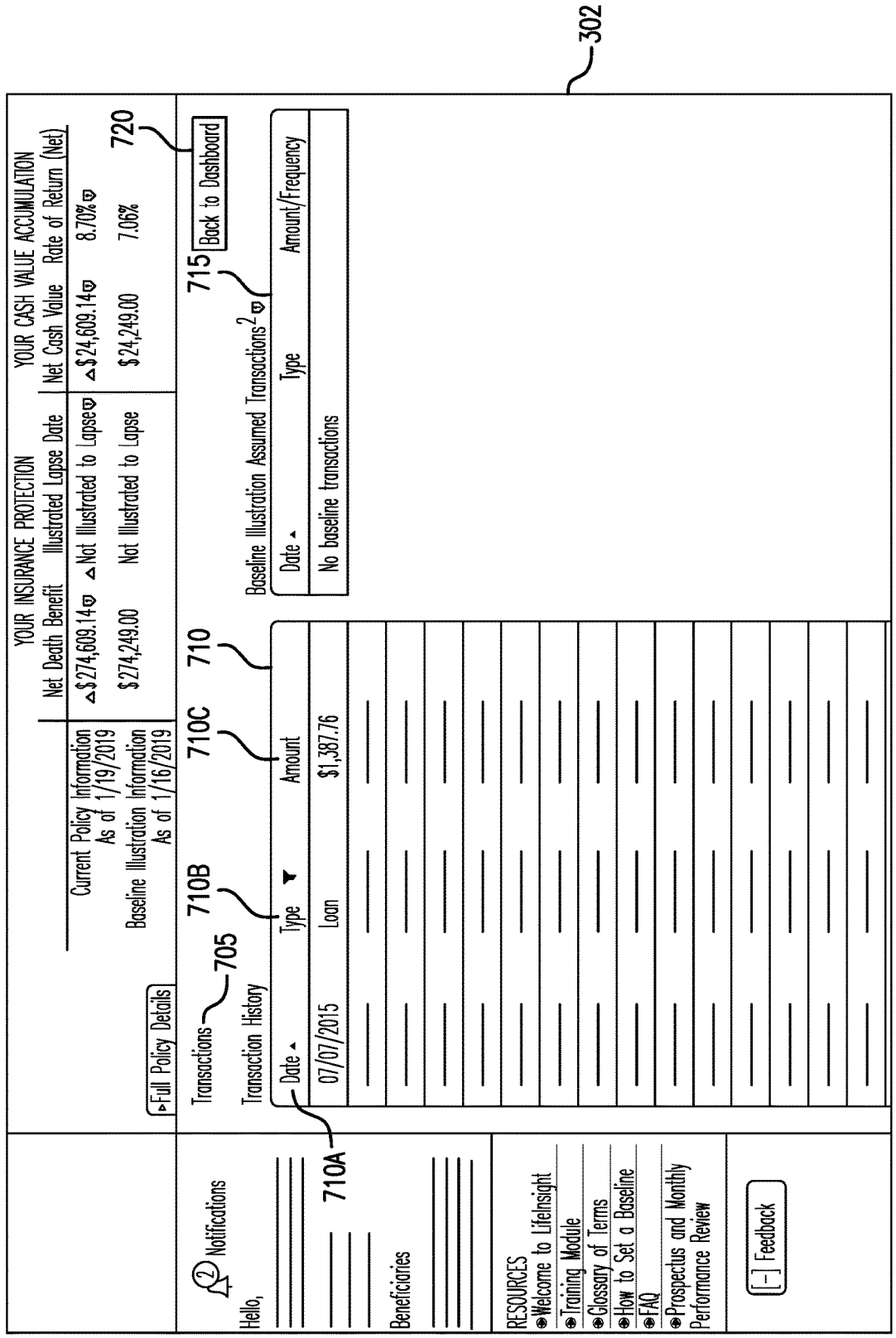
FIG. 7 presents an example of the information displayed on the graphical user interface of FIG. 3 in response to a user selecting a link to display a list of transactions.

FIG. 7 presents an example of the type of information displayed by display tool 105 on graphical user interface 302 in response to a user 110 selecting eighth link 358 to view a consumer's transaction history. When a user 110 selects eighth link 358, display tool 105 displays fifth page 705 on display 165, where fifth page 705 contains completed transactions 150 displayed in transaction history region 710 and scheduled transactions 145 displayed in baseline illustration assumed transactions region 715. For each transaction displayed in transaction history region 710, display tool 105 displays the transaction date 710A, the transaction type 710B, and the transaction amount 710C. Examples of transaction types include loans and withdrawals of funds. By displaying baseline illustration assumed transactions region 715 along with transaction history region 710, display tool 105 enables a user 110 to compare the transactions a consumer has made using his/her life insurance policy with the transactions the consumer was scheduled to make (according to the baseline illustration), thereby easily identifying any discrepancies. Once user 110 is finished with the consumer's transaction history displayed in transaction history region 710 on fifth page 705, he/she can easily return to the main page of graphical user interface 302, simply by selecting back button 720.

Figure 8:
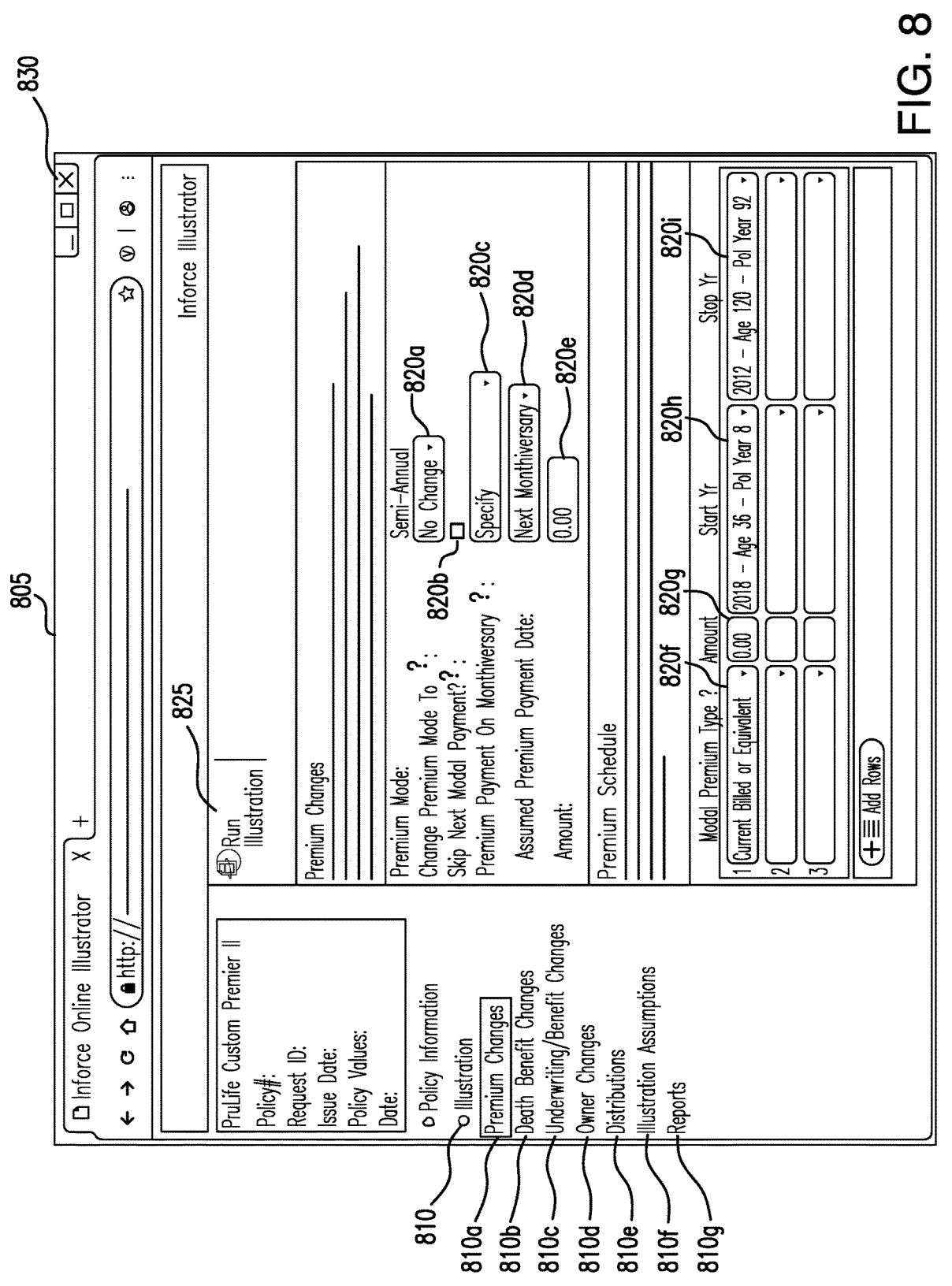

FIG. 8 presents an example of the type of information displayed by display tool 105 on graphical user interface 302 in response to a user 110 selecting fifth link 350 to open the inforce online illustrator. In certain embodiments, when a user 110 selects fifth link 350, display tool 105 displays first form 805 on display 165. First form 805 contains a series of fields 820a through 820i into which a user 110 can input life insurance policy parameters. Display tool 105 then uses these parameters to generate a traditional policy illustration document. In certain embodiments, display tool 105 saves the traditional policy illustration document to memory 160.

In certain embodiments, rather than displaying all of the fields used by display tool 105 to generate the traditional illustration document on display 165 at the same time, first form 805 contains links 810a through 810g to subsets of such fields. For example, when a user 110 selects link 810a, display tool 105 displays fields related to premium changes on first form 805, as shown in FIG. 8. When a user 110 selects link 810b, display tool 105 displays fields related to death benefit changes. When a user 110 selects link 810c, display tool 105 displays fields related to underwriting/benefit changes. When a user 110 selects link 810d, display tool 105 displays fields related to owner changes. When a user 110 selects link 810e, display tool 105 displays fields related to distributions. When a user 110 selects link 810f, display tool 105 displays fields related to illustration assumptions. Finally, when a user 110 selects link 810g, display tool 105 displays fields related to reports.

Once a user 110 has finished inputting parameters into the various fields—illustrated here as fields 820a through 820i, representing the subset of fields accessible under the premium changes link 810a—user 110 may request that display tool 105 use these parameters to generate a traditional illustration document. A user does this by selecting link 825. In response to a user selecting link 825, display tool 105 creates a traditional illustration document based on the parameters user 110 has entered into first form 805. In certain embodiments, display tool 105 then saves the document to memory 160. In this manner, display tool 105 provides users 110 access to life insurance policy information of a traditional format, as illustrated in FIG. 2A, in addition to the more easily accessible format illustrated in FIGS. 2B and 3. Once user 110 is finished generating a traditional illustration document, user 110 can easily return to the main page of graphical user interface 302 simply by closing first form 805 using button 830.

Figure 9:
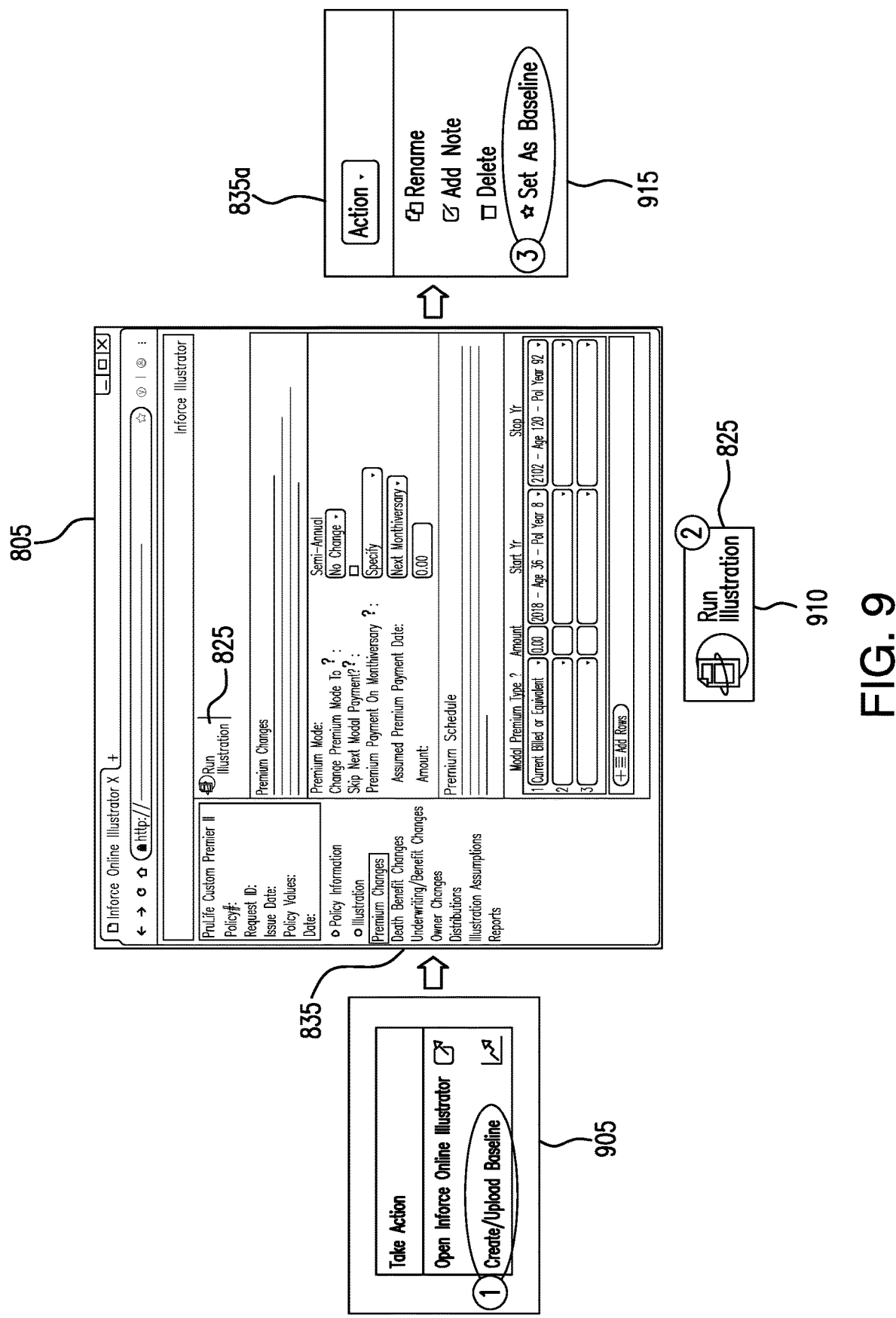
FIG. 9 illustrates the process by which a user of the system of FIG. 1 creates a new baseline.

FIG. 9 illustrates an example of the process by which a user 110 creates a new baseline curve 310 in first region 304 of graphical user interface 302, using display tool 105. In step 905, user 110 selects sixth link 352 to create/update a baseline. In certain embodiments, in response to user 110 selecting sixth link 352, display tool displays second form 805. In certain such embodiments (and as illustrated here), second form 805 is the same as first form 805, described in detail above in the discussion of FIG. 8. User 110 then enters parameters into second form 805 based on policy assumptions that best match the policy goals of the policy owner. Display tool 105 receives these parameters and uses them to determine a series of points representing a new baseline, which the tool then displays in first region 304.

In certain embodiments, display tool 105 receives the parameters in response to user 110 selecting link 825—to generate an illustration based on the parameters—as illustrated in step 910. In generating the illustration based on the parameters, display tool 105 determines a series of points representing the new baseline. The tool then displays these points as baseline curve 310 in first region 304, in response to user 110 selecting "Set As Baseline" from action menu 835a, displayed by display tool 105 in response to user 110 selecting the case history link 835 from first form 805, as illustrated in step 915. In this manner, user 110 can easily add or modify a consumer's baseline illustration curve 310 displayed in first region 304 of graphical user interface 302.

Figure 10:
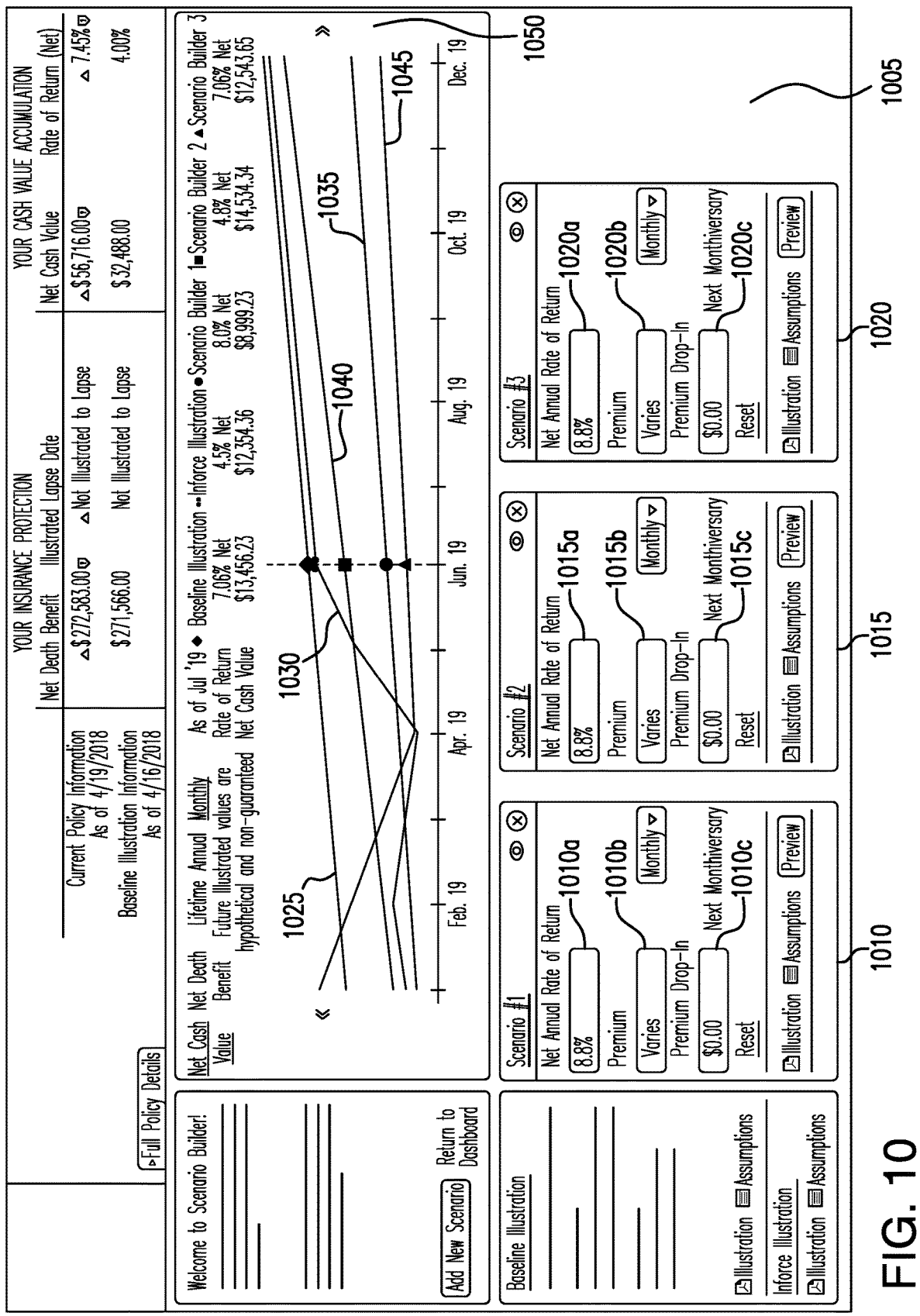
FIG. 10 presents an example of a form displayed on the graphical user interface of FIG. 3 in response to a user selecting a link to create a model scenario, along with example output generated by the system of FIG. 1 in response to a user entering information into the form.

While not illustrated in FIG. 3, in certain embodiments, the main page of graphical user interface 302 additionally includes a link to open a model scenario builder page 1005, as illustrated in FIG. 10. For example, in certain embodiments, the link to open model scenario builder page 1005 is located in fifth region 348 of graphical user interface 302, displayed on display 165.

FIG. 10 presents an example of three forms 1010, 1015, and 1020 displayed on graphical user interface 302 of FIG. 3 in response to a user 110 selecting a link to open model scenario builder page 1005, along with output displayed in output region 1050 that is generated by display tool 105 and displayed on display 165 in response to user 110 entering information into the forms. While the example presented in FIG. 10 illustrates the use of three forms—1010, 1015, and 1020—this disclosure contemplates life insurance tool 105 displaying and receiving input from any number of forms.

Output region 1050 is similar to first region 304, displayed by display tool 105 on the main page of graphical user interface 302. For example, both baseline illustration curve 1025 and in-force illustration curve 1030 are displayed in output region 1050. In addition, display tool 105 displays first scenario curve 1035, second scenario curve 1040, and third scenario curve 145 in output region 1050. Display tool 105 determines first scenario curve 1035 from inputs entered by user 110 into fields 1010a, 1010b, and 1010c, located in first form 1010. Display tool 105 determines second scenario curve 1040 from inputs entered by user 110 into fields 1015a, 1015b, and 1015c, located in second form 1015. Finally, display tool 105 determines third scenario curve 1045 from inputs entered by user 110 into fields 1020a, 1020b, and 1020c, located in third form 1020.

First scenario curve 1035, second scenario curve 1040, and third scenario curve 1045 may be used by user 110 to investigate the effect of certain changes to a life insurance policy over time. For example, a user 110 may use scenario builder page 1005 to determine the long-term effect of an increase in premium payments for a policy. In certain embodiments, fields 1010a, 1010b, and 1010c of form 1010 (along with fields 1015a, 1015b, and 1015c of form 1015 and fields 1020a, 1020b, and 1020c of form 1020) are used to examine the effects of a change in the net annual rate of return for a policy, the premium value for the policy, and a premium drop-in value (i.e., a lump sum additional premium payment) over time. Scenario builder page 1005 may be desirable for producers 110 who wish to counsel policy owners on the effects of certain policy actions that they may be considering taking. Additionally, scenario builder page 1005 may be a useful tool for producers 110 seeking to better understand the effects of various policy parameters and actions on the long-term performance of a policy.

Figure 11:
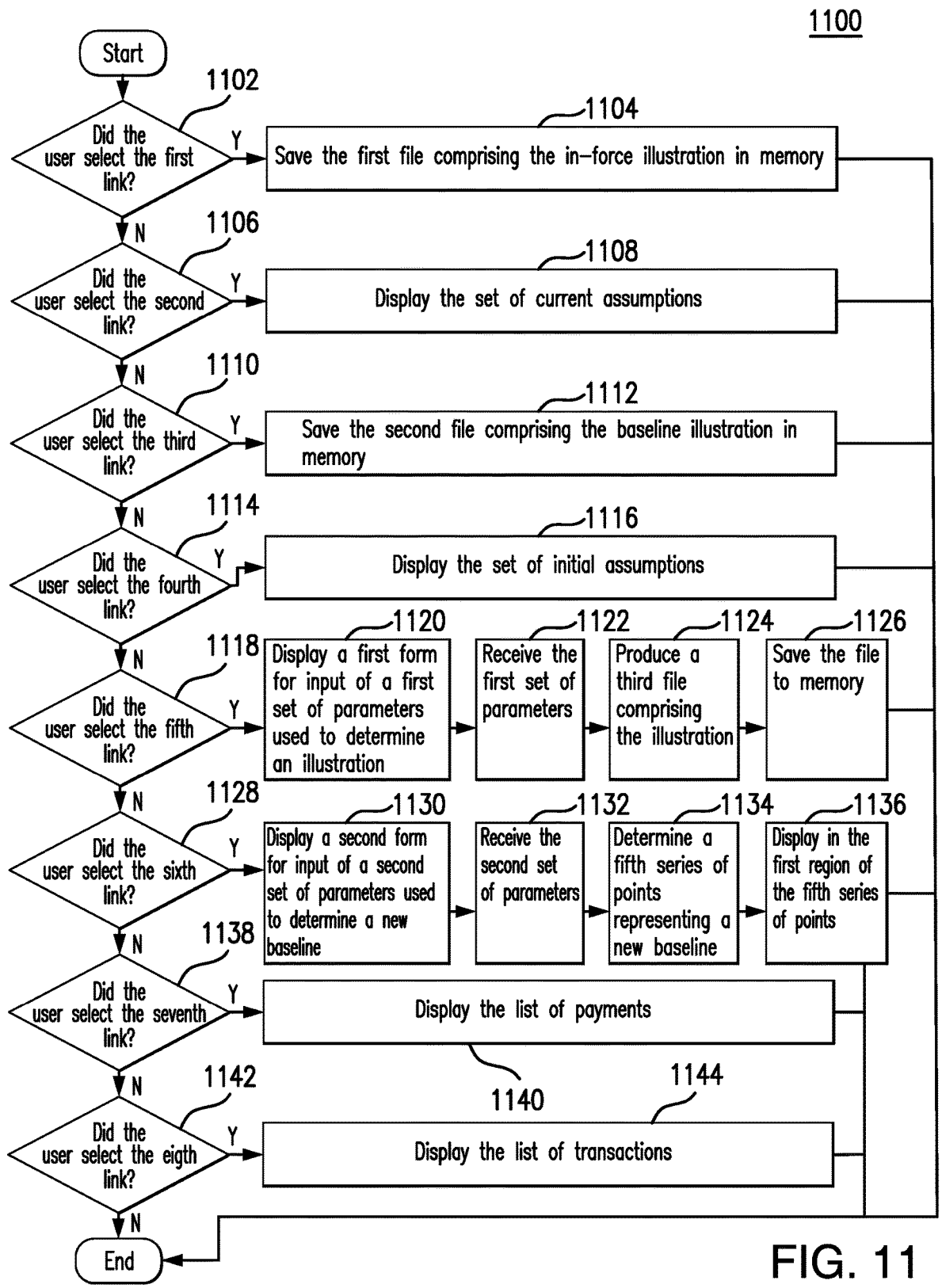
FIG. 11 presents a flowchart illustrating the process by which the system of FIG. 1 displays information on the graphical user interface of FIG. 3 in response to a user selecting various links displayed on the main page of the graphical user interface.

FIG. 11 illustrates the process by which life insurance tool 105 displays information on graphical user interface 302 in response to a user 110 selecting a link displayed on the main page of graphical user interface 302.

In step 1102, display tool 105 determines if user 110 selected first link 340 displayed in fourth region 338. If user 110 selected first link 340, display tool 105 saves a first file including the in-force illustration in memory 160, in step 1104. If user 110 did not select first link 340, then in step 1106, display tool 105 determines if user 110 selected second link 342 displayed in fourth region 338. If user 110 selected second link 342, display tool 105 displays the set of current assumptions 130 on display 165, in step 1108. If user 110 did not select second link 342, then in step 1110, display tool 105 determines if user 110 selected third link 344 displayed in fourth region 338. If user 110 selected third link 344, display tool 105 next saves a second file including the baseline illustration in memory 160, in step 1112. If user 110 did not select third link 344, then in step 1114, display tool 105 determines if user 110 selected fourth link 346 displayed in fourth region 338. If user 110 selected fourth link 346, display tool 105 displays the set of initial assumptions 125 on display 165, in step 1116.

This disclosure contemplates that the set of initial assumptions 125 and the set of current assumptions 130 can include values such as the desired death benefit, the desired rate of return, the policy premium, desired distributions from the policy, and included policy riders. In certain embodiments, the set of initial assumptions 125 and the set of current assumptions 130 are the same. This may occur when a policy consumer has not sought to change any of the attributes of his/her policy during the lifetime of the policy.

If user 110 did not select fourth link 346, then in step 1118, display tool 105 determines if user 110 selected fifth link 350 displayed in fifth region 348. If user 110 selected fifth link 350, display tool 105 displays a first form 805 on display 165 for input of a first set of parameters used to determine a traditional policy illustration document, in step 1120.

In certain embodiments, first form 805 contains a series of fields 820a through 820i into which a user 110 can input the first set of parameters. In certain further embodiments, rather than displaying all of the fields used by display tool 105 to generate the traditional illustration document on display 165 at the same time, first form 805 contains links 810a through 810g to subsets of such fields. For example, when a user 110 selects link 810a, display tool 105 displays fields related to premium changes on first form 805, as shown in FIG. 8. When a user 110 selects link 810b, display tool 105 displays fields related to death benefit changes. When a user 110 selects link 810c, display tool 105 displays fields related to underwriting/benefit changes. When a user 110 selects link 810d, display tool 105 displays fields related to owner changes. When a user 110 selects link 810e, display tool 105 displays fields related to distributions. When a user 110 selects link 810f, display tool 105 displays fields related to illustration assumptions. Finally, when a user 110 selects link 810g, display tool 105 displays fields related to reports.

Next, in step 1122, display tool 105 receives the first set of parameters. In certain embodiments, display tool 105 receives the first set of parameters in response to user 110 selecting a link to generate a traditional illustration document. For example, user 110 may select link 825, as illustrated in FIG. 8. Display tool 105 then uses the first set of parameters to create a traditional illustration document, in step 1124. Finally, in step 1126, display tool 105 saves this document to memory 160.

If user 110 did not select fifth link 350, then in step 1128, display tool 105 determines if user 110 selected sixth link 352 displayed in fifth region 348. If user 110 selected sixth link 352, display tool 105 displays a second form 805 for input of a second set of parameters used to determine a new baseline, in step 1130. An example second form 805 is provided in FIG. 8. In certain such embodiments (and as illustrated here), second form 805 is the same as first form 805, described in detail above as well as in the discussion of FIG. 8. As can be seen in FIG. 8, second form 805 contains a series of fields, 820a through 820i, into which user 110 can input life insurance policy parameters. Once user 110 has input such parameters into second form 805, display tool 105 next receives the parameters, in step 1132. Display tool 105 then uses the parameters to determine a fifth series of points representing a new baseline curve 310, in step 1134. Finally, in step 1136, display tool 1126 displays the fifth series of points in first region 304 of display 165.

In certain embodiments, display tool 105 receives the parameters in response to user 110 selecting link 825 (which is used to generate an illustration based on the parameters) as illustrated in FIG. 9. In generating the illustration based on the parameters, display tool 105 determines a series of points representing the new baseline. The tool then displays these points as baseline curve 310 in first region 304, in response to user 110 selecting "Set As Baseline" from action menu 835a, displayed by display tool 105 in response to user 110 selecting the case history link 835 from first form 805, as further illustrated in FIG. 9.

If user 110 did not select sixth link 352, then in step 1138 display tool 105 determines if user 110 selected seventh link 356 displayed in sixth region 354. If user 110 selected seventh link 354, display tool 105 displays the list of payments 140 on display 165, in step 1140. If user 110 did not select seventh link 356, then in step 1142 display tool 105 next determines if user 110 selected eighth link 358 displayed in sixth region 354. If user 110 selected eighth link 358, display tool 105 displays both scheduled transactions 145 and completed transaction 150 on display 165.

Modifications, additions, or omissions may be made to method 1100 depicted in FIG. 11. Method 1100 may include more, fewer, or other steps. For example, steps may be performed in parallel or in any suitable order. While discussed as display tool 105 (or components thereof) performing the steps, any suitable component of system 100 may perform one or more steps of the method.

By providing a producer access to a wide variety of policy information that the producer can reach directly from the main page of graphical user interface 302, simply by clicking a single link, display tool 105 greatly simplifies the manner in which the producer accesses information about a given policy, thereby enabling the producer to more efficiently monitor his/her policies.

FIG. 12 presents an example of information displayed on graphical user interface 302, in certain embodiments in which display tool 105 provides notifications to users 110. In certain such embodiments, display tool 105 provides notifications to users 110 in response to upcoming scheduled transactions. This may be desirable, for example, in situations where policy owners are scheduled to take distributions from their policies. Such policy owners may be unlikely to take the scheduled distributions without first receiving notification from the producers 110 who manage their policies. However, given the large number of policies a producer 110 typically manages, the producer may easily overlook scheduled transactions, and fail to notify a policy owner that the owner should take a distribution from his/her policy. Therefore, by providing a notification to a producer 110 about an upcoming distribution that a policy owner is scheduled to take, certain embodiments enable producers 110 to more reliably notify policy owners about distributions the owners should take. Display tool 105 is able to provide users 110 with notifications related to upcoming scheduled transactions by monitoring scheduled transactions 145 stored in database 120. If display tool 105 determines that a transaction stored in the list of scheduled transactions 145 is scheduled to occur within a set period of time, it will generate a notification regarding this transaction, as discussed in further detail below.

In certain further embodiments, display tool 105 provides notifications to users 110 in response to unscheduled transactions. This may be desirable, for example, in situations where policy owners have taken distributions from their policies and/or taken loans out against their policies, either of which may put the policies in danger of lapsing. By providing a producer 110 with a notification of such an unscheduled transaction, certain embodiments may enable a producer to counsel a policy owner about the effect of his/her action, to help prevent his/her policy from lapsing. Display tool 105 is able to provide users 110 with notifications related to unscheduled transactions by monitoring completed transactions 150 stored in database 120. If display tool 105 determines that a transaction stored in the list of completed transactions 150 is not also stored in the list of scheduled transactions 145, it will generate a notification regarding this transaction, as discussed in further detail below.

In certain embodiments, display tool 105 provides notifications to users 110 in the form of a notification link 1205 displayed on the main page of graphical user interface 302 to the left of first region 304. When a user 110 selects notification link 1205, display tool 105 displays notification page 1210 on display 165, where notification page 1210 contains details of the notification(s). For example, notification page 1210 illustrated in FIG. 12 contains details about four notifications—notifications 1215a through 1215d. Once a user 110 has viewed his/her notifications, the user can return to the main page of graphical user interface 302 by selecting back button 1220.

In certain embodiments, display tool 105 additionally provides notifications to users 110 in the form of an electronic message 190 sent to user 110. This disclosure contemplates that message 190 can be an SMS text message, an electronic mail message, an application push-notification message, or any other type of electronic message communicated by display tool 105 to user 110. Sending message 190 to user 110 in addition to displaying notification link 1205 on display 165 may be desirable for those users 110 who do not regularly view graphical user interface 302 of display tool 105. Providing messages 190 to such users 110 in addition to displaying notification link 1205 on graphical user interface 302, will likely provide such users 110 with additional time during which they can contact policy owners to warn them about the risk of their policies lapsing and/or notify them that they should take distributions from their policies prior to the lapse and/or scheduled distribution date.

Figure 13:
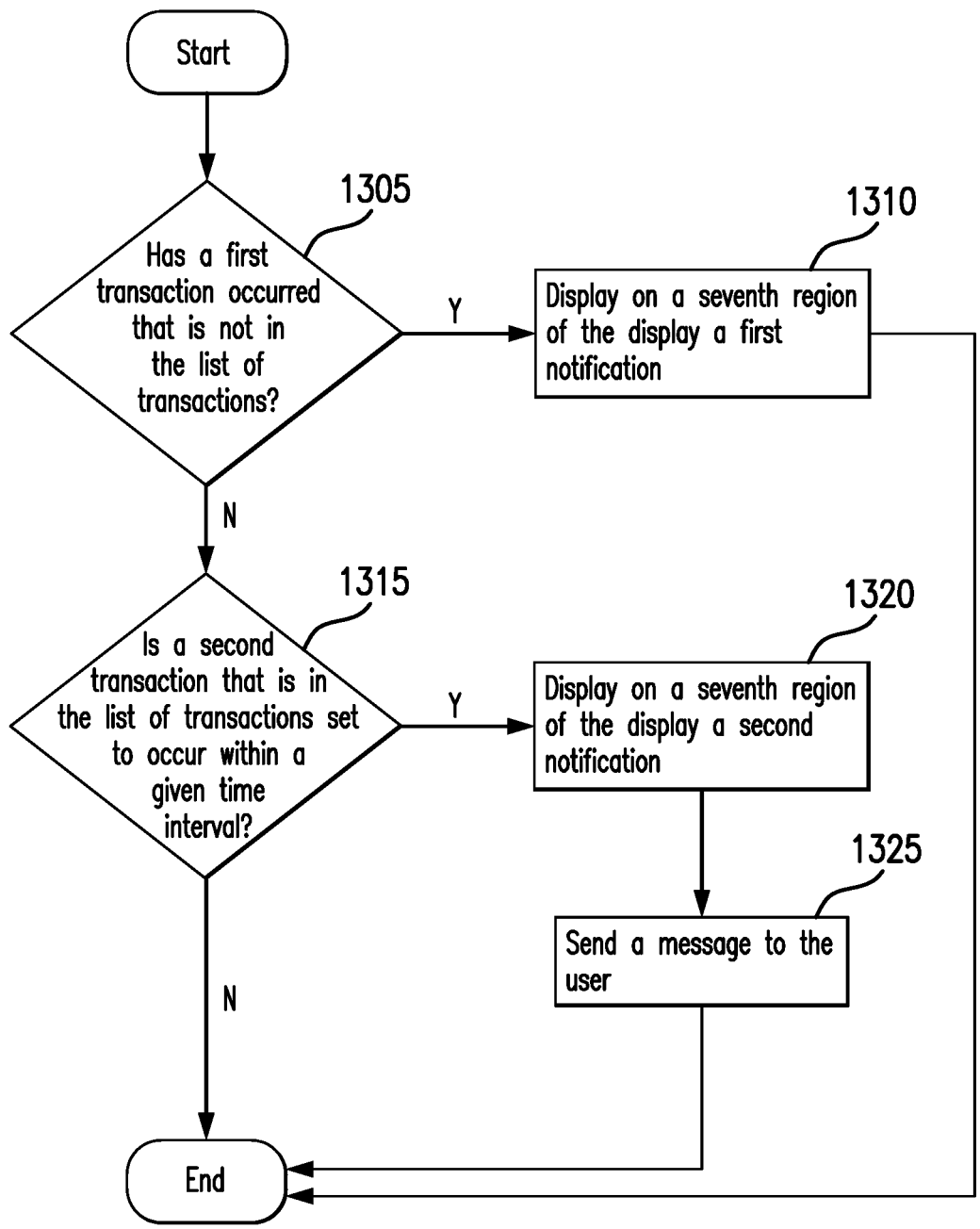
FIG. 13 presents a flowchart illustrating the process by which the system of FIG. 1 displays a notification link on the graphical user interface of FIG. 3.

FIG. 13 illustrates the process by which the system of FIG. 1 displays a notification link on graphical user interface 302, displayed on display 165. In step 1305, display tool 105 monitors completed transactions 150 and determines if a transaction has occurred that is not in the list of scheduled transactions 145. If display tool 105 determines that a transaction has occurred that is not in the list of scheduled transactions 145, display tool 105 next displays a notification link 1205 on display 165, in step 1310. If display tool 105 does not determine that a transaction has occurred that is not in the list of scheduled transactions 145, display tool 105 next determines if a transaction that is in the list of scheduled transactions 145 is set to occur within a given time interval, in step 1315. In certain embodiments, the given time interval is set by user 105. If display tool 105 determines that a transaction that is in the list of scheduled transactions 145 is set to occur within the given time interval, in step 1320, display tool 105 displays a notification link 1205 on display 165. Next, in step 1325, display tool 105 sends an electronic message 190 to user 110 containing the notification.

Modifications, additions, or omissions may be made to method 1300 depicted in FIG. 13. Method 1300 may include more, fewer, or other steps. For example, steps may be performed in parallel or in any suitable order. While discussed as display tool 105 (or components thereof) performing the steps, any suitable component of system 100 may perform one or more steps of the method.

Figure 14A:
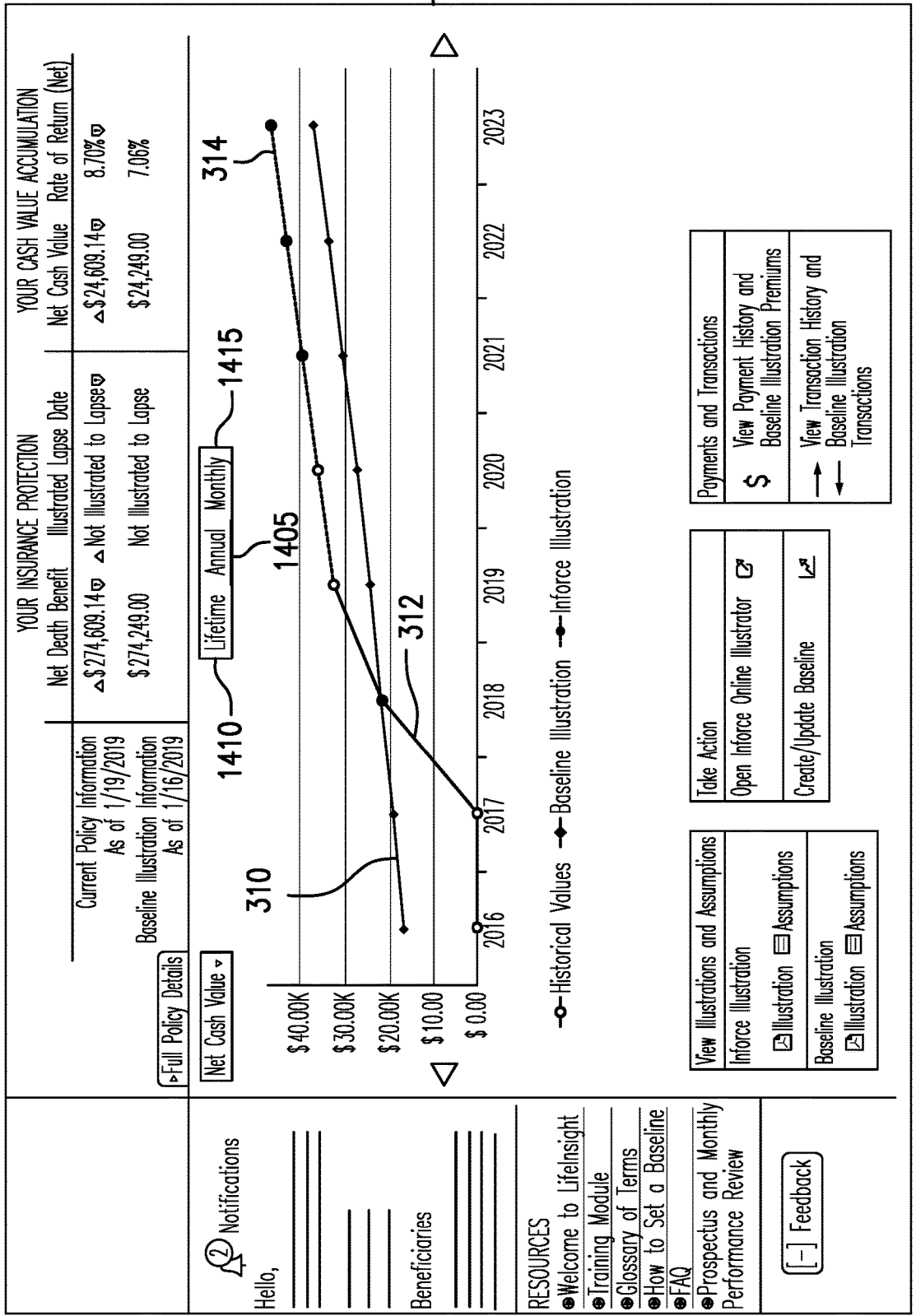
FIGS. 14A and 14B present examples in which the graphical user interface of FIG. 3 displays policy illustration data over different timescales, including an annual timescale and a lifetime timescale.
Figure 14B:
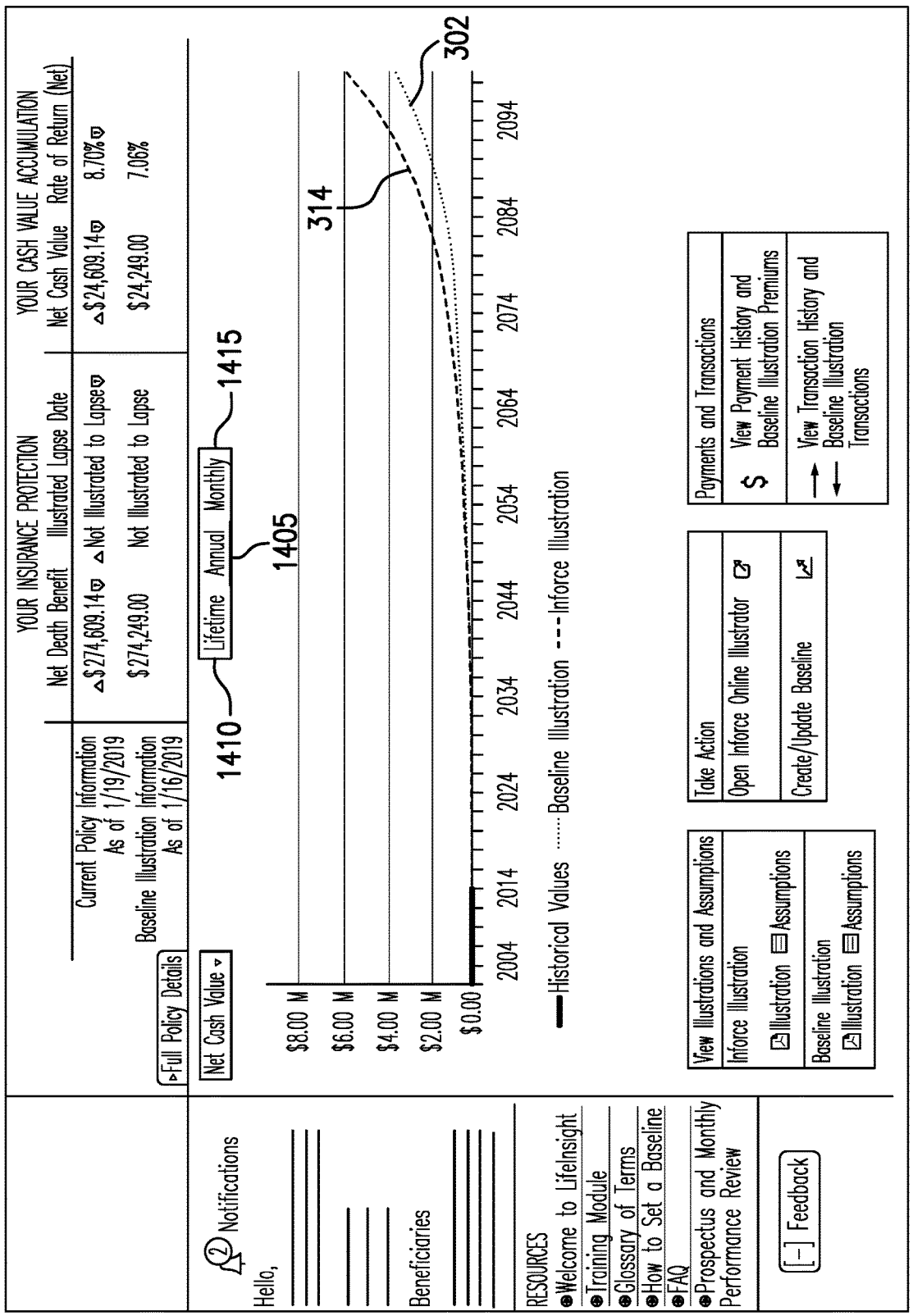

FIGS. 14A and 14B present alternative views of first region 304 of graphical user interface 302. In certain embodiments, first region 304 of graphical user interface 302 additionally contains three links—1405, 1410, and 1415—that a user 110 can use to display baseline illustration curve 310, historical performance curve 312, and in-force curve 314 over three different timescales. For example, in response to a user selecting link 1405, display tool 105 displays baseline illustration curve 310, historical performance curve 312, and in-force curve 314 over an annual timescale, as illustrated in FIG. 14A. In response to a user 110 selecting link 1410, display tool 105 displays baseline illustration curve 310, historical performance curve 312, and in-force curve 314 over the expected lifetime of the policy, as illustrated in FIG. 14B. Finally, in response to a user 110 selecting link 1415, display tool 105 may display baseline illustration curve 310, historical performance curve 312, and in-force curve 314 over a monthly timescale.

Enabling a user 110 to display baseline illustration curve 310, historical performance curve 312, and in-force curve 314 over a variety of different timescales may be desirable to help the user fully understand the effect of various actions taken on the policy. For example, as seen in FIG. 14A, baseline curve 310 and in-force curve 314 appear to have the same values over the annual timescale illustrated. Therefore, a user 110 viewing only FIG. 14A may assume that a policy owner has taken actions on his/her policy to fully compensate for the deviation of historical curve 312 from baseline curve 310 and to thereby return the policy to its baseline values. However, by viewing baseline curve 310 and in-force curve 314 on a much longer timescale, as illustrated in the lifetime view of FIG. 14B, user 110 can clearly see that in-force curve 314 and baseline curve 310 are not in fact the same.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. An apparatus comprising:
a hardware processor configured to:
present, on a display, a curve comprising a series of points representing an illustration of values for a life insurance policy over time, the curve comprising at least one of:
a baseline curve, wherein the illustration is based on a set of initial assumptions and an initial value of the life insurance policy;
a historical performance curve, wherein the series of points comprises actual values of the life insurance policy over a period of time prior to a present time; or
an in-force curve, wherein the series of points comprises predictions for future values for the life insurance policy over time, the predictions based on a set of current assumptions and a current value of the life insurance policy; and
present, on the display, a link, selectable by a user, the link corresponding to at least one of:
a first link to download a file comprising at least one of the first illustration and the second illustration;
a second link to display at least one of:
the set of current assumptions;
the set of initial assumptions;
a list of payments; and
a list of transactions;
a third link to open an in-force illustrator application to generate an illustration; and
a fourth link to create or update a new baseline.

2. The apparatus of claim 1, wherein the hardware processor is further configured to present, on a region of the display defined by a horizontal time axis, a fourth series of points, wherein:
each point of the fourth series of points corresponds to a transaction identified in the list of transactions; and
a position of each point of the fourth series of points on the horizontal time axis identifies a time of the corresponding transaction.

3. The apparatus of claim 1, wherein:
the link corresponds to the third link to open the in-force illustrator application; and
in response to receiving a selection of the link, the hardware processor is further configured to:
receive a set of parameters; and
generate, based on the set of parameters, a file comprising the illustration.

4. The apparatus of claim 3, wherein receiving the set of parameters comprises presenting, on the display, a set of fields for input of one or more parameters of the set of parameters.

5. The apparatus of claim 3, wherein the set of parameters comprises a parameter associated with at least one of:
a change to a premium payment associated with the life insurance policy;

a change to a death benefit associated with the life insurance policy;
a change to an owner of the life insurance policy; and
one or more distributions associated with the life insurance policy.

6. The apparatus of claim 1, wherein:
the list of transactions is stored in a memory; and
the hardware processor is further configured to:
  determine that a first transaction has occurred that is not identified in the list of transactions; and
  in response to determining that the first transaction has occurred, present a first notification associated with the first transaction on the display.

7. The apparatus of claim 1, wherein:
the list of transactions is stored in a memory; and
the hardware processor is further configured to:
  determine that a second transaction that is identified in the list of transactions is scheduled to occur within a set time interval; and
  in response to determining that the second transaction is scheduled to occur within the set time interval, present a second notification associated with the second transaction on the display.

8. The apparatus of claim 7, wherein in response to determining that the second transaction is scheduled to occur within the set time interval, the hardware processor is further configured to send a message to a device, the message alerting a user of the device that the second transaction is scheduled to occur within the set time interval.

9. The apparatus of claim 1, wherein:
the link corresponds to the fourth link to create or update the new baseline; and
in response to receiving a selection of the link, the hardware processor is further configured to:
  receive a set of parameters used to define the new baseline;
  generate, based on the set of parameters, a fourth series of points representing the new baseline; and
  present, on the display, a new baseline curve comprising the fourth series of points.

10. The apparatus of claim 9, wherein:
the curve comprises the baseline curve; and
presenting the new baseline curve comprises replacing the baseline curve with the new baseline curve.

11. A method comprising:
displaying a curve comprising a series of points representing an illustration of values for a life insurance policy over time, the curve comprising at least one of:
  a baseline curve, wherein the illustration is based on a set of initial assumptions and an initial value of the life insurance policy;
  a historical performance curve, wherein the series of points comprises actual values of the life insurance policy over a period of time prior to a present time; or
  an in-force curve, wherein the series of points comprises predictions for future values for the life insurance policy over time, the predictions based on a set of current assumptions and a current value of the life insurance policy; and
displaying a link, selectable by a user, the link corresponding to at least one of:
  a first link to download a file comprising at least one of the first illustration and the second illustration;
  a second link to display at least one of:
    the set of current assumptions;
    the set of initial assumptions;
    a list of payments; and
    a list of transactions;
  a third link to open an in-force illustrator application to generate an illustration; and
  a fourth link to create or update a new baseline.

12. The method of claim 11, further comprising presenting, on a region of a display defined by a horizontal time axis, a fourth series of points, wherein:
each point of the fourth series of points corresponds to a transaction identified in the list of transactions; and
a position of each point of the fourth series of points on the horizontal time axis identifies a time of the corresponding transaction.

13. The method of claim 11, wherein:
the link corresponds to the third link to open the in-force illustrator application; and
in response to receiving a selection of the link, the method further comprises:
  receiving a set of parameters; and
  generating, based on the set of parameters, a file comprising the illustration.

14. The method of claim 13, wherein receiving the set of parameters comprises displaying a set of fields for input of one or more parameters of the set of parameters.

15. The method of claim 13, wherein the set of parameters comprises a parameter associated with at least one of:
a change to a premium payment associated with the life insurance policy;
a change to a death benefit associated with the life insurance policy;
a change to an owner of the life insurance policy; and
one or more distributions associated with the life insurance policy.

16. The method of claim 11, further comprising:
determining that a first transaction has occurred that is not identified in the list of transactions, wherein the list of transactions is stored in a memory; and
in response to determining that the first transaction has occurred, displaying a first notification associated with the first transaction.

17. The method of claim 11, further comprising:
determining that a second transaction that is identified in the list of transactions is scheduled to occur within a set time interval, wherein the list of transactions is stored in a memory; and
in response to determining that the second transaction is scheduled to occur within the set time interval, displaying a second notification associated with the second transaction.

18. The method of claim 17, wherein in response to determining that the second transaction is scheduled to occur within the set time interval, the method further comprises sending a message to a device, the message alerting a user of the device that the second transaction is scheduled to occur within the set time interval.

19. The method of claim 11, wherein:
the link corresponds to the fourth link to create or update the new baseline; and
in response to receiving a selection of the link, the method further comprises:
  receiving a set of parameters used to define the new baseline;
  generating, based on the set of parameters, a fourth series of points representing the new baseline; and displaying a new baseline curve comprising the fourth series of points.

20. The method of claim 19, wherein:

the curve comprises the baseline curve; and displaying the new baseline curve comprises replacing the baseline curve with the new baseline curve.

\* \* \* \* \*